(12) United States Patent
Willard et al.

(10) Patent No.: US 10,611,217 B2
(45) Date of Patent: Apr. 7, 2020

(54) VEHICLE ROOF HAVING REMOVABLE RIGID ROOF PANELS

(71) Applicant: Webasto SE, Stockdorf (DE)

(72) Inventors: Michael T Willard, Harrison Township, MI (US); Dennis Felker, Brighton, MI (US)

(73) Assignee: Webasto SE, Stockdorf (DE)

( * ) Notice: Subject to any disclaimer, the term of this patent is extended or adjusted under 35 U.S.C. 154(b) by 0 days.

(21) Appl. No.: 15/964,501

(22) Filed: Apr. 27, 2018

(65) Prior Publication Data

US 2019/0329638 A1 Oct. 31, 2019

(51) Int. Cl.
| | | |
|---|---|---|
| B60J 7/11 | (2006.01) | |
| B60J 7/19 | (2006.01) | |
| B60J 7/16 | (2006.01) | |

(52) U.S. Cl.
CPC ............... *B60J 7/11* (2013.01); *B60J 7/1642* (2013.01); *B60J 7/192* (2013.01); *B60J 7/196* (2013.01)

(58) Field of Classification Search
CPC ..... B60J 7/11; B60J 7/719; B60J 7/192; B60J 7/194; B60J 7/196; B60J 7/1628; B60J 7/1856
USPC ............ 296/218, 224, 120.1, 104, 105, 210, 296/216.07, 203.03
See application file for complete search history.

(56) References Cited

U.S. PATENT DOCUMENTS

| | | | | |
|---|---|---|---|---|
| 2,124,117 A | * | 7/1938 | Nichols .................... | B60J 7/194 292/164 |
| 3,712,665 A | * | 1/1973 | Klein ....................... | B60J 7/106 292/113 |
| 4,397,499 A | * | 8/1983 | Work ....................... | B60J 7/194 292/205 |
| 8,991,896 B1 | * | 3/2015 | Whitehead ............... | B60J 7/106 296/121 |
| 2006/0028057 A1 | * | 2/2006 | Kurtz ....................... | B60J 7/192 296/218 |

FOREIGN PATENT DOCUMENTS

EP 2439091 * 4/2012 .............. B60J 7/11

* cited by examiner

*Primary Examiner* — Dennis H Pedder
(74) *Attorney, Agent, or Firm* — Fitch, Even, Tabin & Flannery, LLP

(57) ABSTRACT

A vehicle roof is provided having, according to one embodiment, two lateral longitudinal roof beams that laterally define a roof opening and are connected to each other via a transverse roof beam that has a base support. The transverse roof beam can be selectively secured to and detached from the longitudinal roof beams by a latching device and has a fixing device for at least one rigid roof panel, the fixing device being displaceable between a locked position, in which the at least one rigid roof panel is secured, and a release position, in which the at least one rigid roof panel can be removed from the vehicle roof.

14 Claims, 35 Drawing Sheets

VEHICLE ROOF HAVING REMOVABLE RIGID ROOF PANELS

FIELD

A vehicle roof is provided having two lateral longitudinal beams that laterally define a roof opening and are connected to each other via a transverse roof beam.

BACKGROUND

From practice, automobiles are known that are configured in the manner of an all-terrain vehicle or of an SUV (sports utility vehicle), for example, and have a vehicle in roof that covers a vehicle interior. The vehicle roof is provided with two lateral longitudinal roof beams that laterally define a roof opening. The roof opening can be closed by means of a rigid roof panel that is selectively fixed to the roof structure or removed from the roof structure so as to be separately stored in a storage space of the vehicle in question, for example.

SUMMARY

The object of the present disclosure is to provide embodiments of a vehicle roof that has a roof opening which can either be closed by means of at least one rigid roof panel or be at least partially opened with a high degree of flexibility.

According to one approach, this object is attained by a vehicle roof having two lateral longitudinal roof beams that laterally define a roof opening and are connected to each other via a transverse roof beam that has a base support, wherein the transverse roof beam can be selectively secured to or detached from the longitudinal roof beams by a latching device and can have a fixing device for at least one rigid roof panel, the fixing device being displaceable between a locked position, in which the at least one roof panel is secured, and a release position, in which the at least one rigid roof panel can be removed from the vehicle roof.

The proposed vehicle roof can thus be variably configured by a user, namely to have a transverse roof beam and at least one rigid roof panel, a transverse beam and no rigid roof panel, or no transverse beam and no rigid roof panel. The fact that the transverse roof beam can be removed from the roof structure allows a maximum opening area to be provided in the area of the roof opening. If the vehicle roof is provided with multiple rigid roof panels, the rigid roof panels can be removed from the vehicle roof individually or collectively, the fixing device, when in its locked position, securing the roof panel(s) remaining on the roof.

In a specific embodiment of the vehicle roof according to one approach, the fixing device comprises a driving device for displacing kinematics. The driving device can be operated in particular manually and, in this case, preferably comprises a manually operable operating handle. Alternatively, it is also conceivable for the driving device to comprise a drive motor in the form of an electric motor or of a hydraulic drive.

The displacing kinematics can be designed in different manners. For example, the displacing kinematics comprises at least one displacing link which is coupled with the driving device and by means of which at least one fixing element can be driven that interacts with a fixing counterpart formed on the rigid roof panel.

For example, the fixing element is a fixing hook which is engaged with the fixing counterpart of the roof panel when the fixing device is in the locked position, or a fixing pin which is engaged with the fixing counterpart of the roof panel when the fixing device is in the locked position. The fixing pin can be a rigid pin or have a roller.

In another specific embodiment of the vehicle roof according to one approach, the displacing kinematics comprises at least one slide which can be moved in relation to the base support. The slide can be used to operate multiple fixing elements for multiple roof panels.

For example, the slide drives at least one pivotable fixing hook for securing the at least one roof panel.

Alternatively or additionally, a fixing element formed by a pin, by a roller or by a hook can be disposed on the slide, said fixing element being engaged with a fixing counterpart formed on the roof panel when the fixing device is in the locked position.

In an advantageous embodiment, the latching device by means of which the transverse roof beam can be secured to the longitudinal roof beams comprises one latching element for each longitudinal roof beam, said latching element interacting with a respective latching counterpart.

The latching elements can be disposed on the transverse roof beam, whereas the latching counterparts are then formed on the longitudinal roof beams. For example, the latching elements are formed by latching hooks each pivotably mounted on the base support, the latching counterparts in the form of hook seats or loops each being disposed on one of the longitudinal roof beams.

It is also conceivable for the latching elements to each be formed by a latching pin which engages into a corresponding seat on the respective longitudinal roof beam, said seat forming the respective latching counterpart. In particular, a latching pin of this kind can also be configured in the manner of a spring-loaded falling latch, which is pulled back in order to detach the transverse roof beam from the longitudinal roof beams.

Advantageously, an operating device for the latching device is provided. It can be configured for manual operation or for operation by motor. If configured for manual operation, the operating device can comprise a manually operable lever which is disposed on the underside of the base support.

For operation of the latching element, it is advantageous if a coupling device is provided via which the operating device is connected to the latching elements. The coupling device can be formed by kinematics that comprises a link and/or at least one pull cable or Bowden cable.

In a specific embodiment of the vehicle roof according to one approach, the latching elements can be pivoted between a locked position and a release position and are pre-loaded either in the direction of the locked position or in the direction of the release position by a spring device.

BRIEF DESCRIPTION OF THE DRAWINGS

Embodiments of vehicle roofs according to the present embodiments are illustrated in a schematically simplified manner in the drawing and will be explained in more detail in the following description.

DETAILED DESCRIPTION

Figure 1:
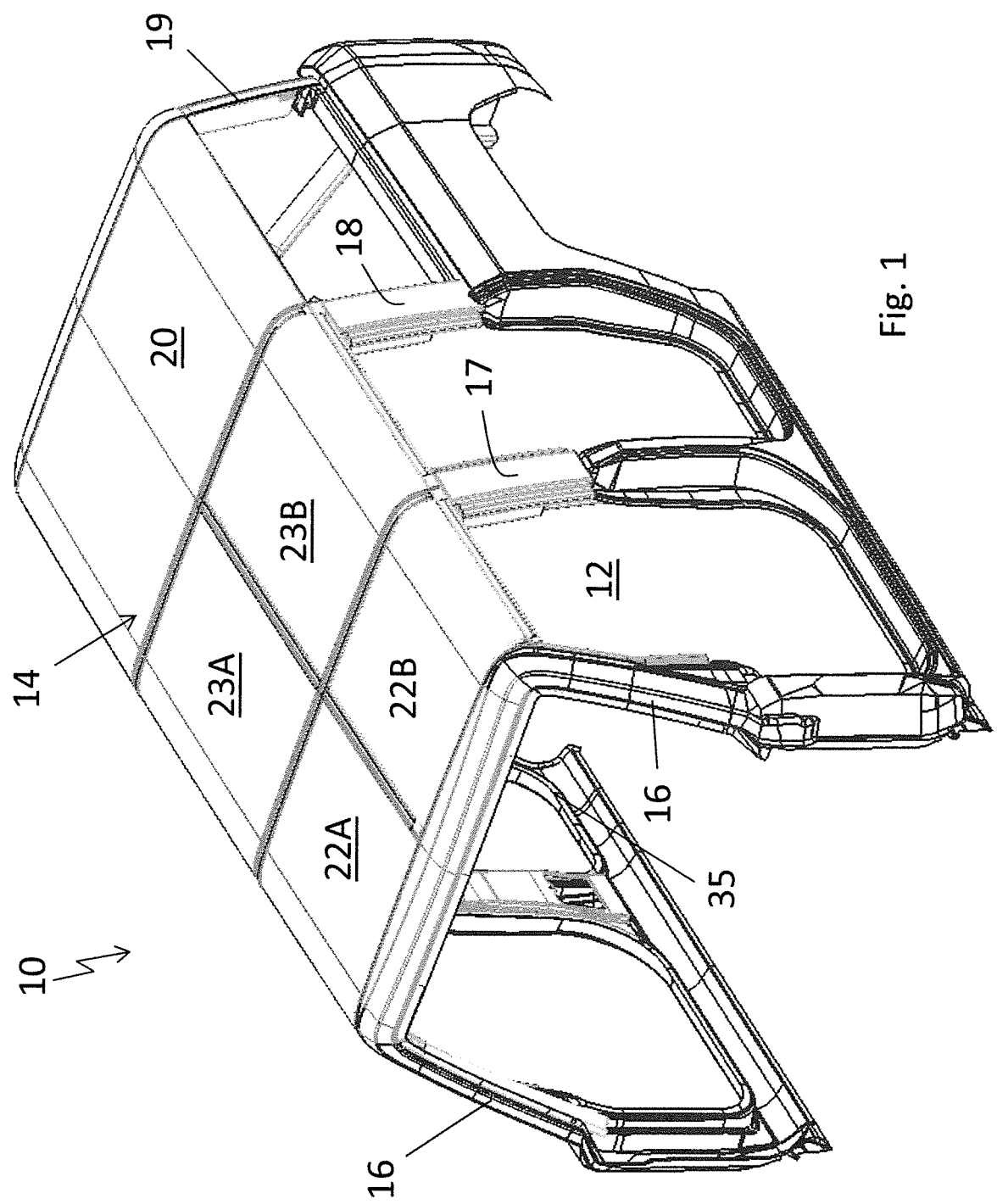
FIG. 1 shows a perspective partial view of an automobile having a vehicle roof according to one approach of the present embodiments.
Figure 2:
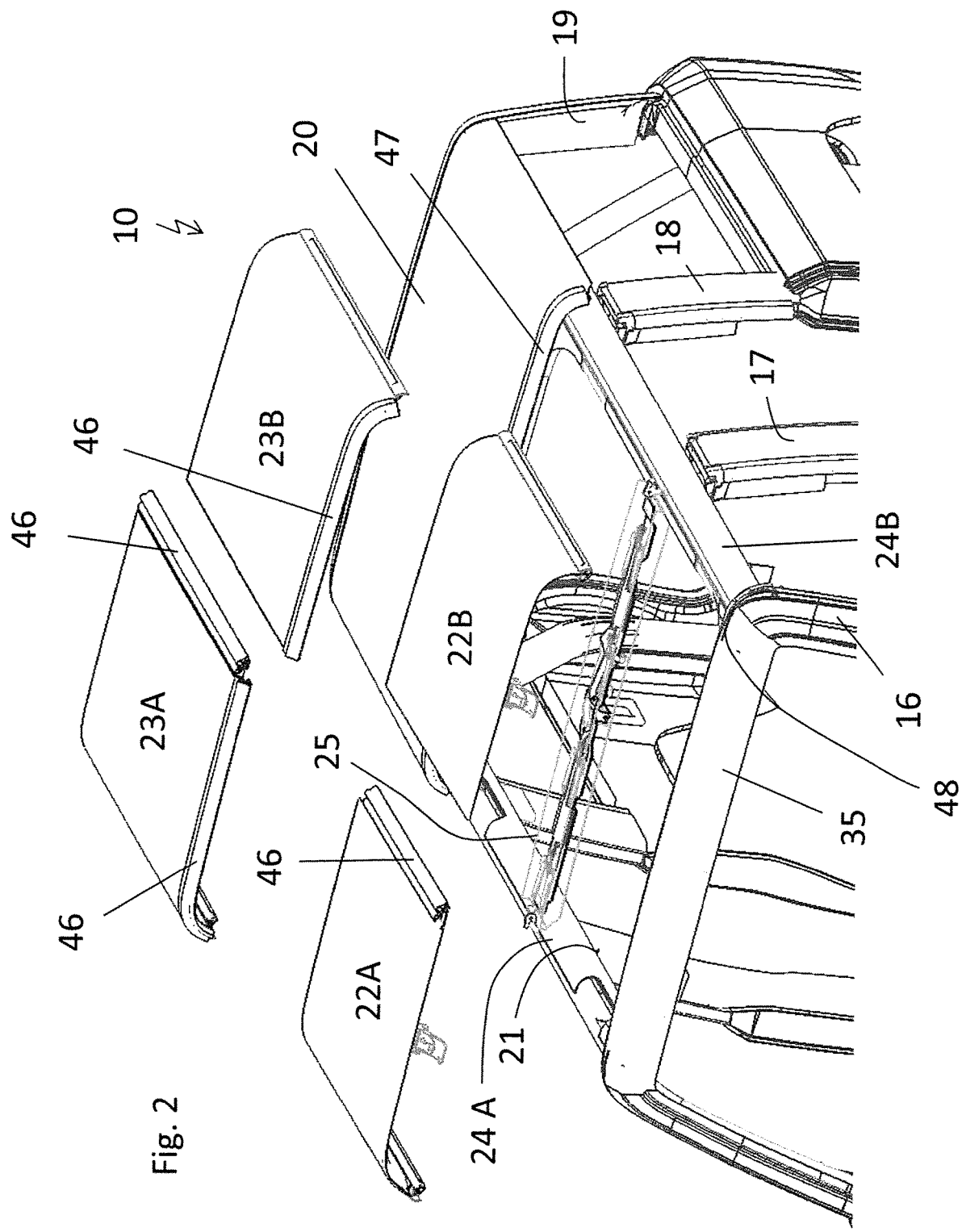
FIG. 2 shows a perspective view of the vehicle roof with the roof panels removed.
Figure 3:
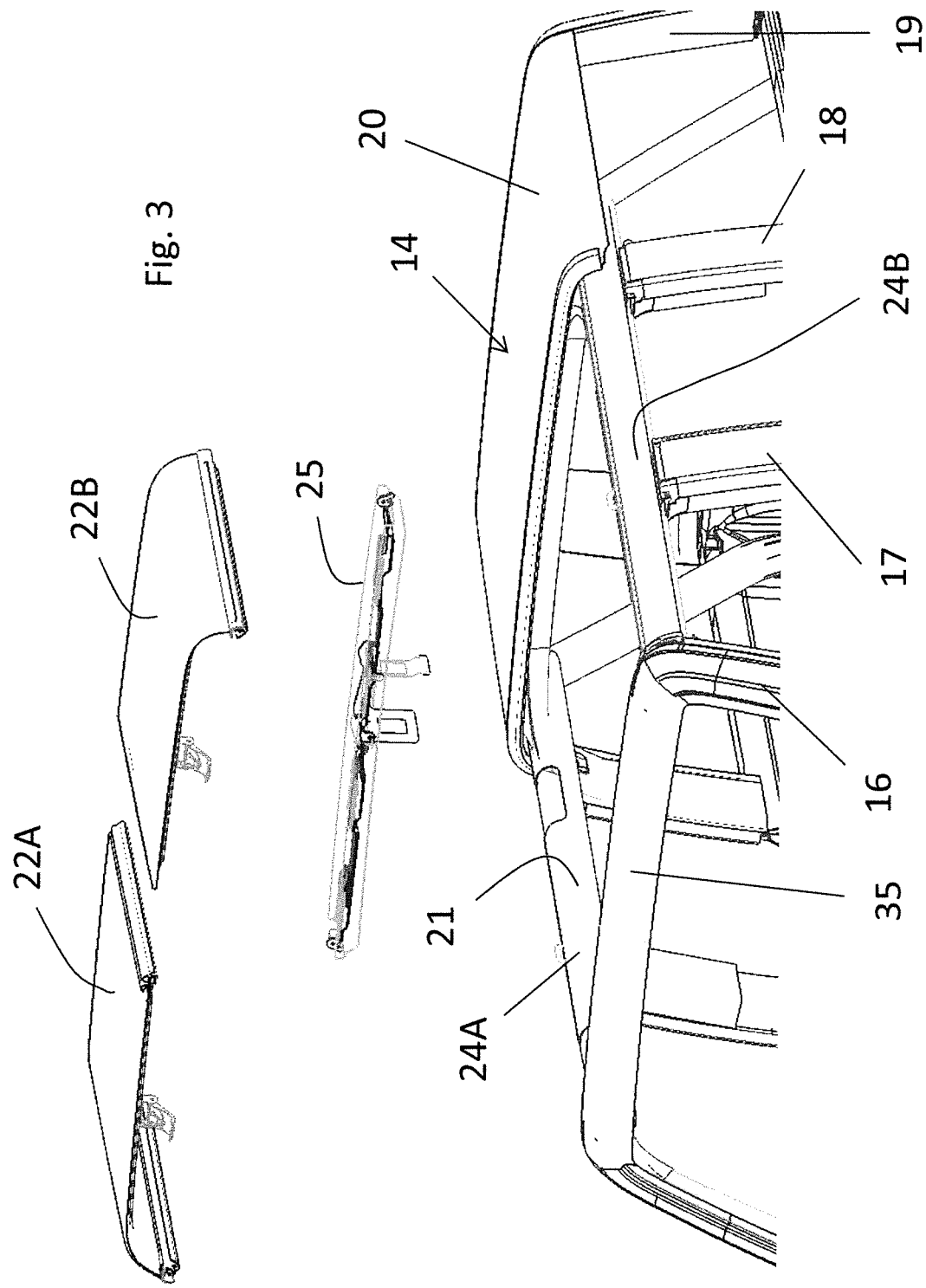
FIG. 3 shows a perspective view of the vehicle roof with the roof panels removed and the transverse roof beam removed.
Figure 4:
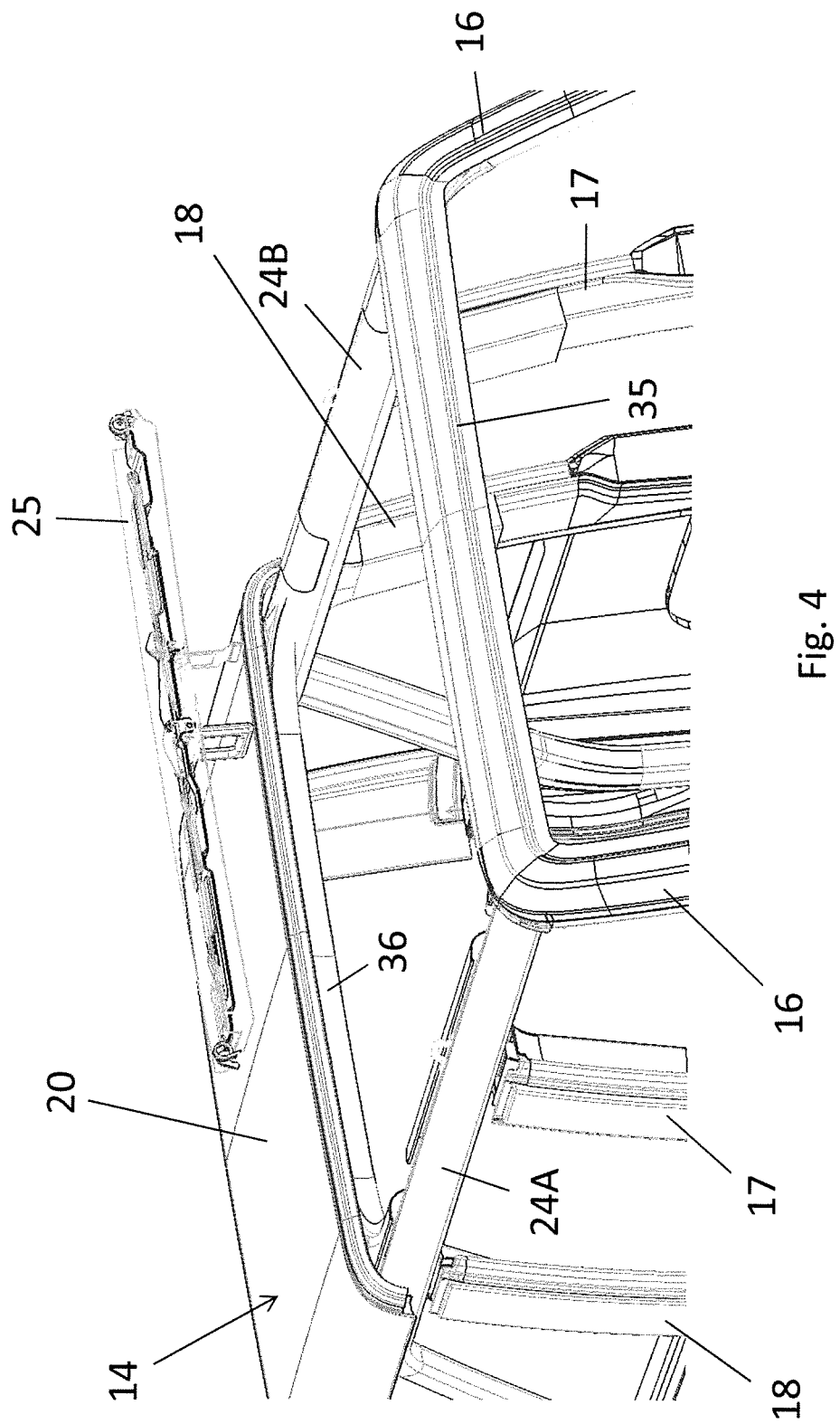
FIG. 4 shows another perspective view of the vehicle roof with the roof panels removed and the transverse roof beam removed.
Figure 5:
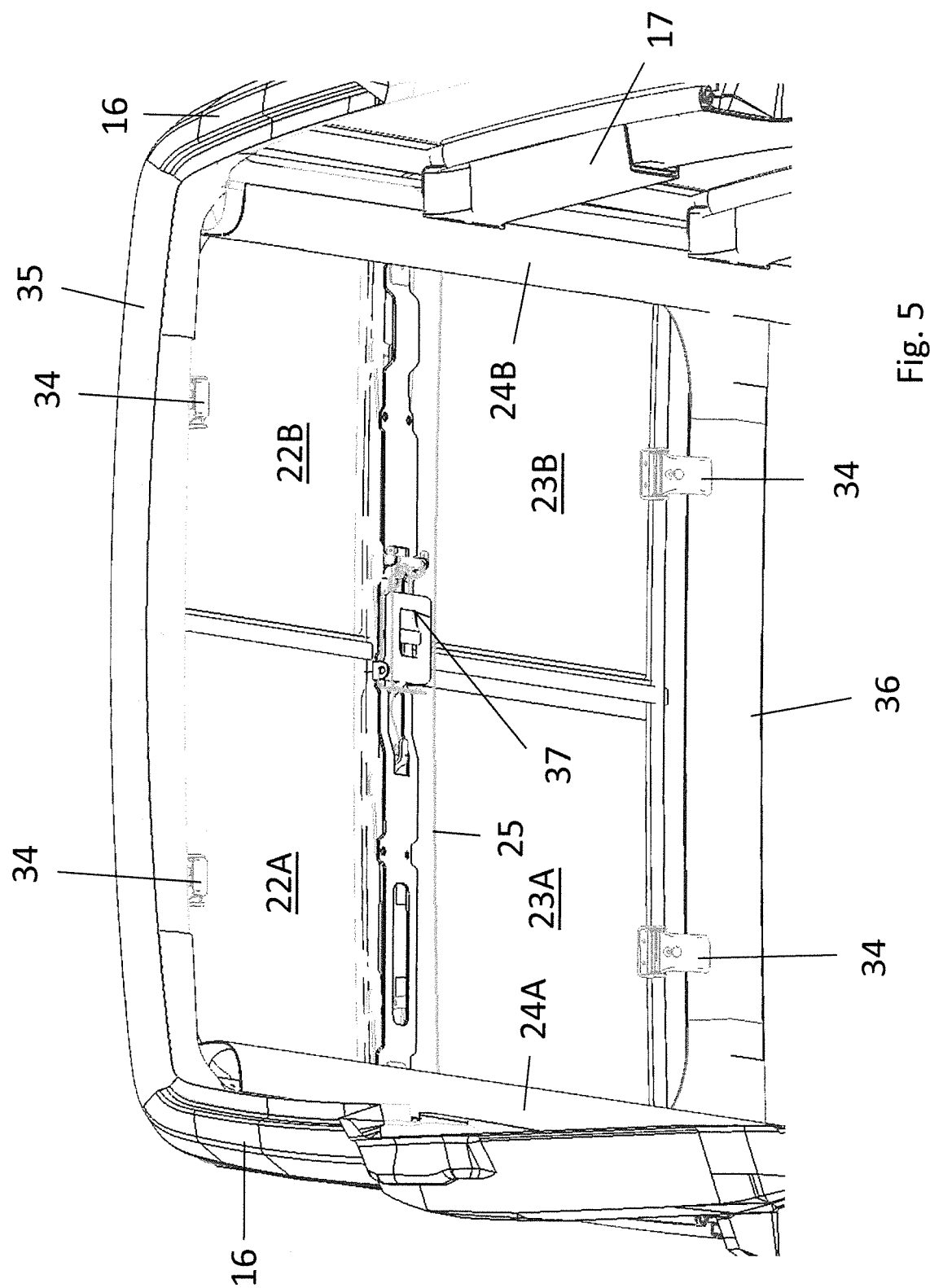
FIG. 5 shows a bottom view of the vehicle roof with the roof panels mounted and the transverse roof beam mounted.
Figure 6:
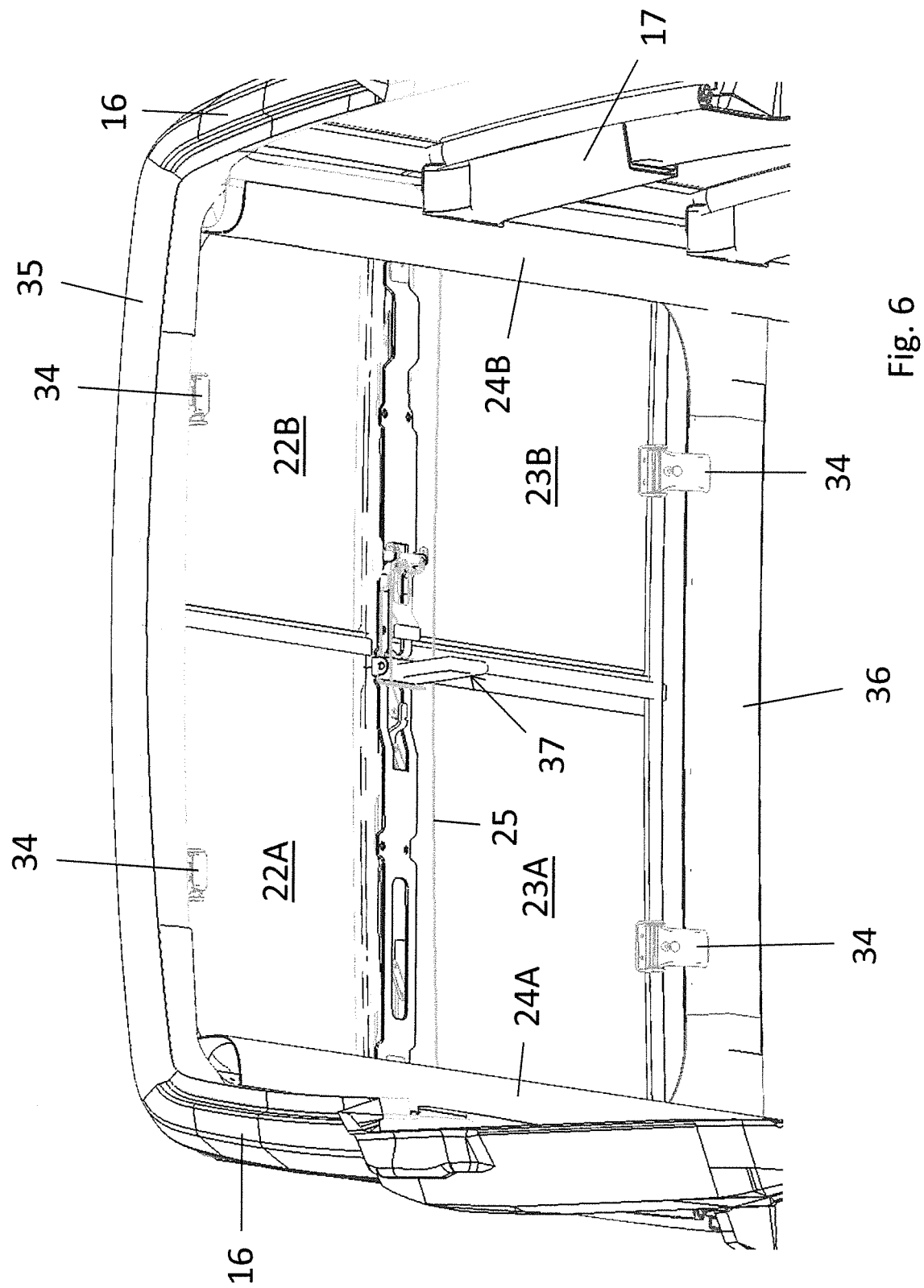
FIG. 6 shows a bottom view of the vehicle roof corresponding to FIG. 5, but with the roof panels unsecured.
Figure 7:
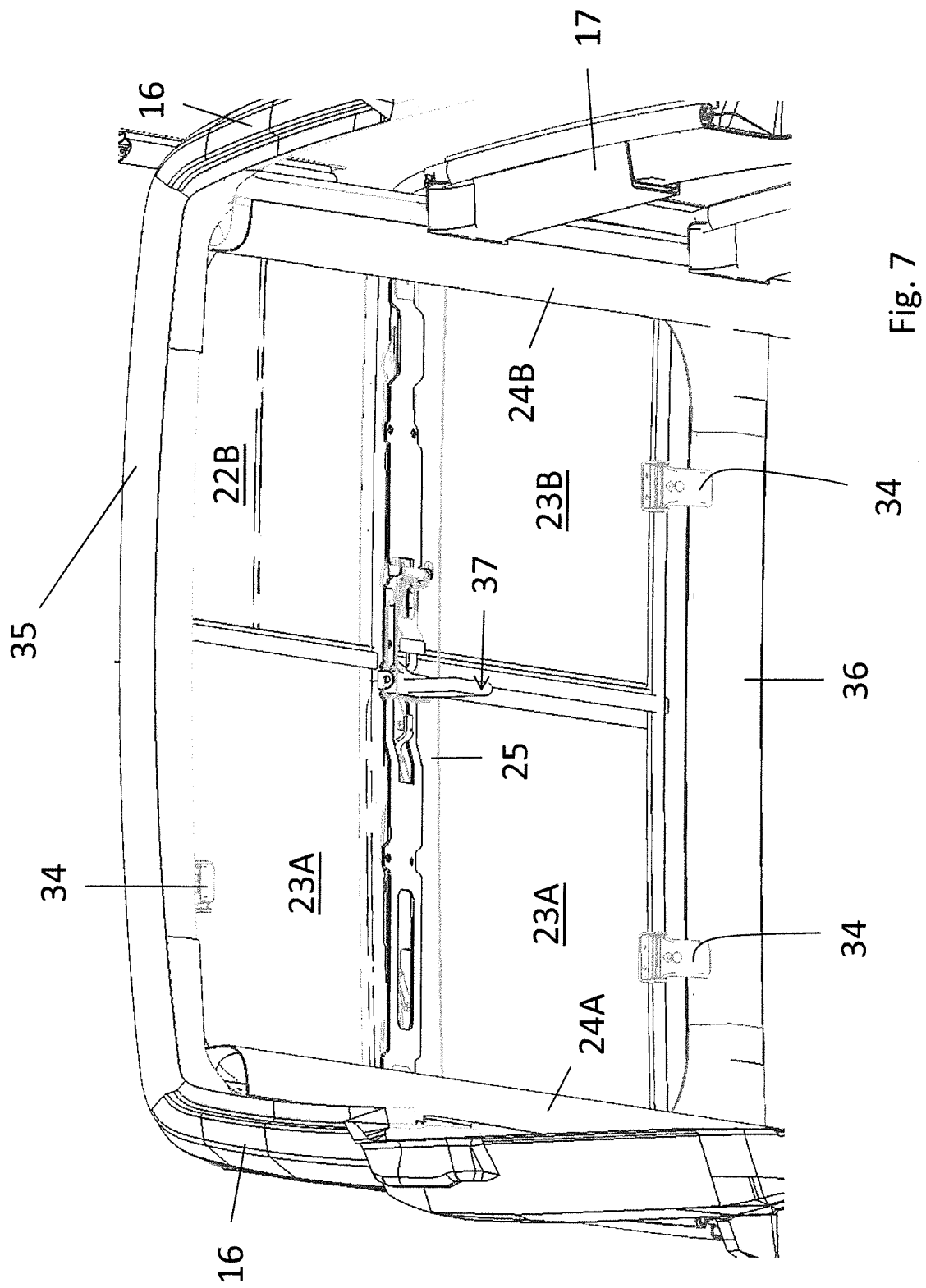
FIG. 7 also shows a bottom view of the vehicle roof corresponding to FIG. 5, but with one roof panel removed.
Figure 8:
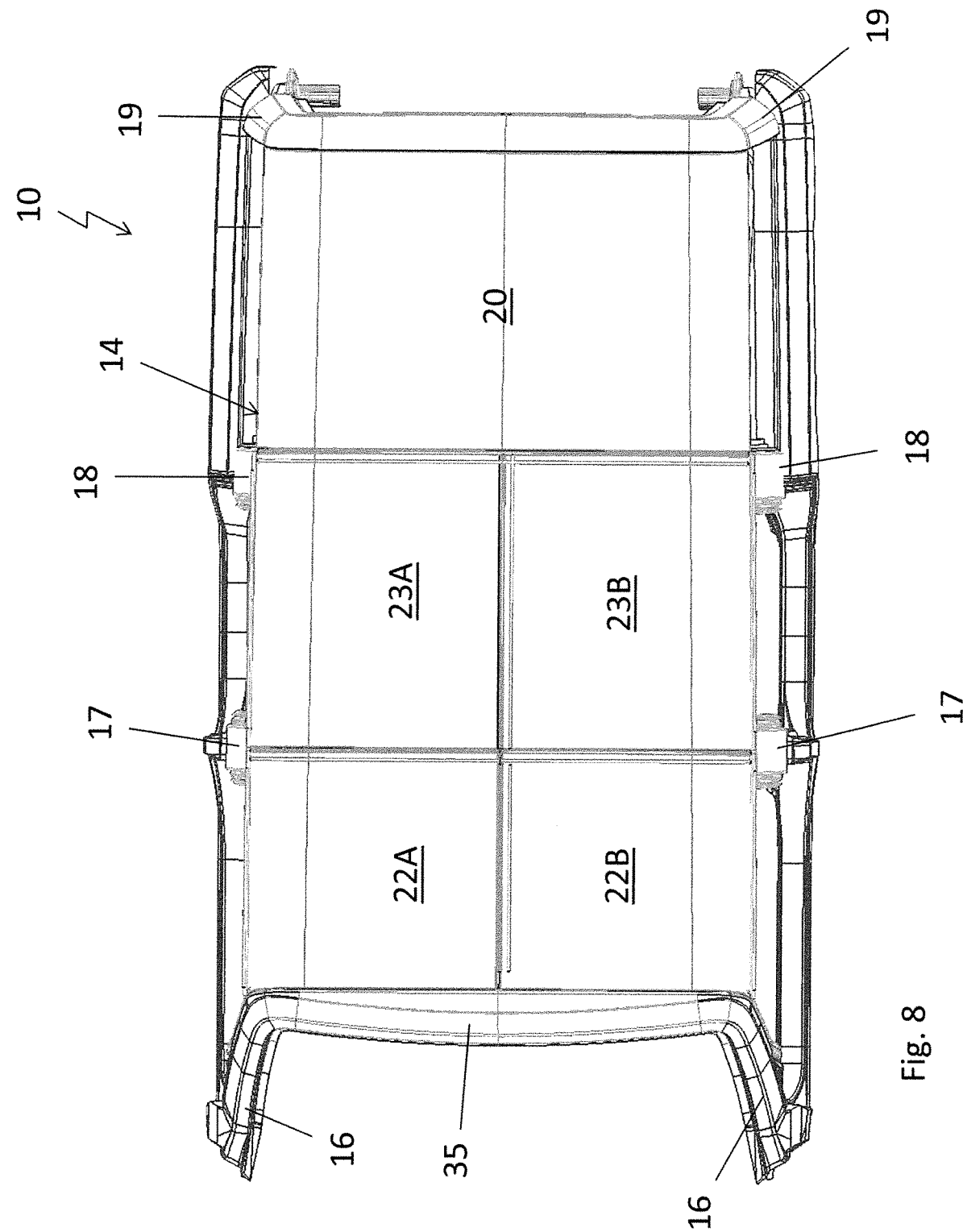
FIG. 8 shows a top view of the vehicle roof in the closed state.
Figure 9:
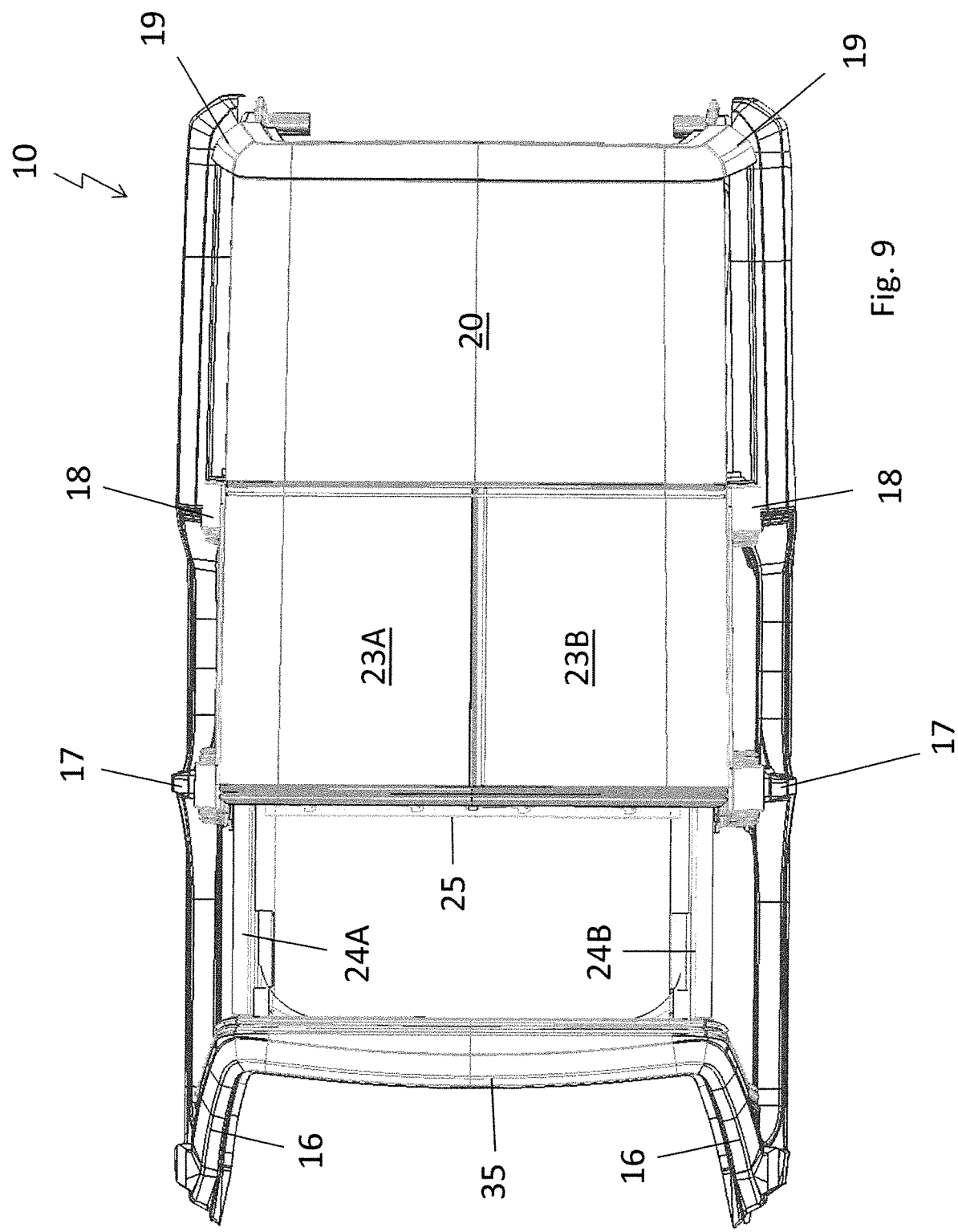
FIG. 9 shows a top view of the vehicle roof in a state where two front roof panels are removed.
Figure 10:
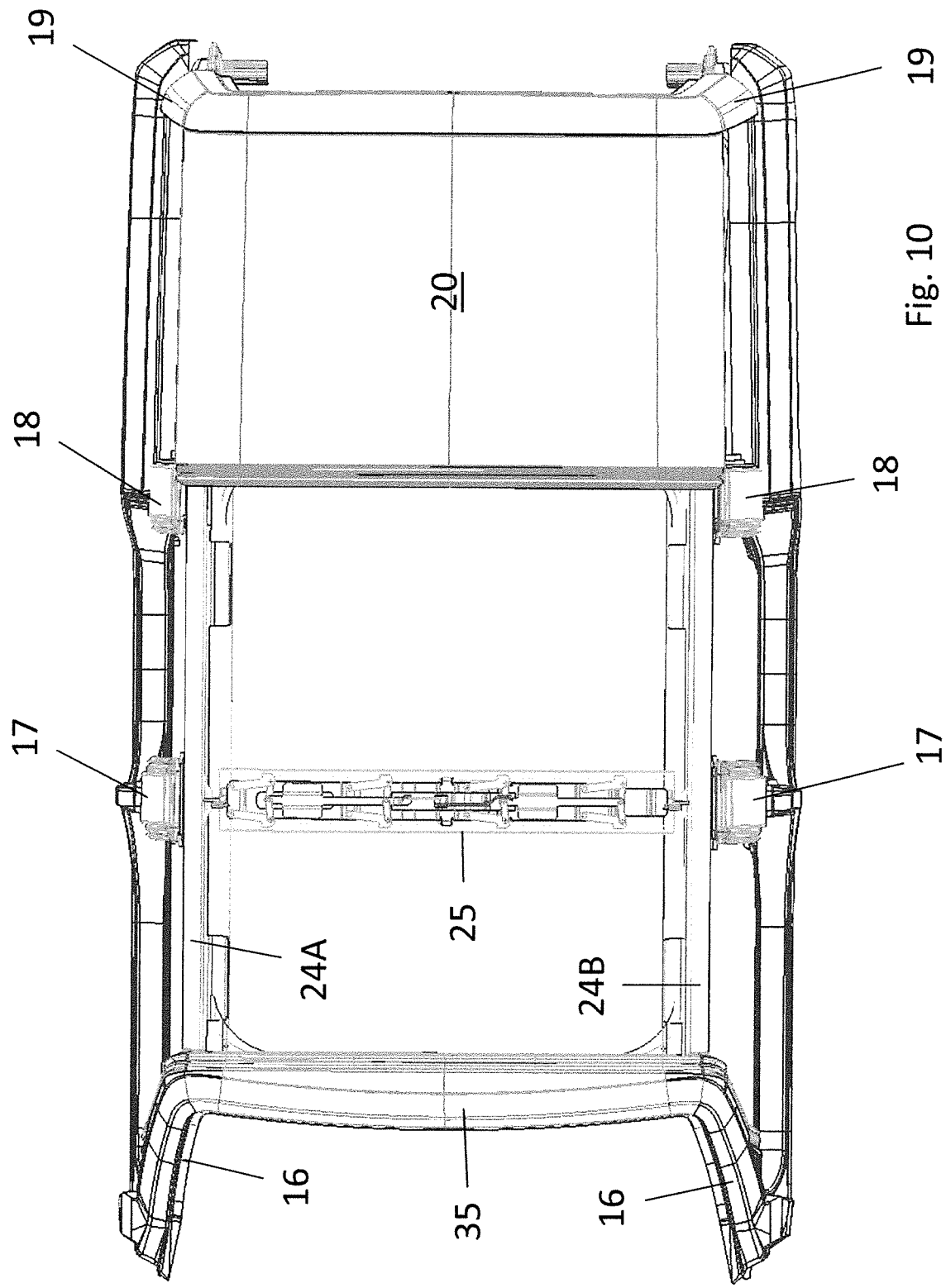
FIG. 10 shows a top view of the vehicle roof with the roof panels removed and the transverse roof beam mounted.
Figure 11:
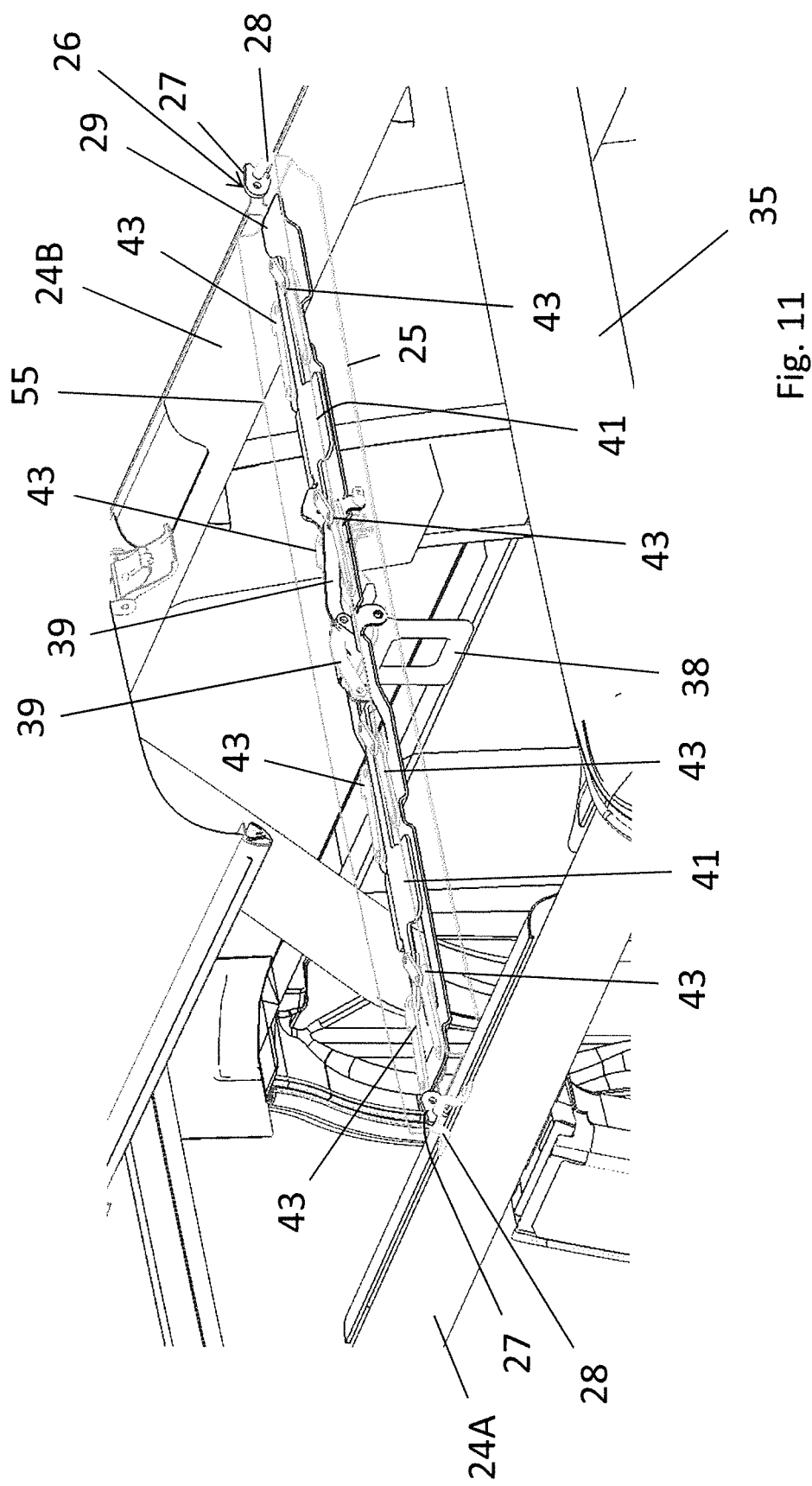
FIG. 11 shows a perspective view of the vehicle roof with the roof panels removed and the transverse roof beam mounted.

In FIGS. 1 to 24, a vehicle body of an all-terrain vehicle is illustrated, which has a vehicle interior 12 that is covered by a vehicle roof 14. On either side of a vertical longitudinal center plane of the vehicle, the vehicle body has four pillars 16, 17, 18 and 19, of which pillar 16 forms an A-pillar, pillar 17 forms a B-pillar, pillar 18 forms a C-pillar and pillar 19 forms a D-pillar. In the area between the C-pillars 18 and the D-pillars 19, the vehicle roof 14 has a solid roof section 20 which is mounted rigidly or fixedly with respect to the vehicle body 10. In the area between the A-pillars 16 and the C-pillars 18, the vehicle roof 14 has a roof opening 21 which can be closed by four removable rigid roof panels 22A, 22B, 23A and 23B.

On either side of the vertical longitudinal center plane of the vehicle, the vehicle roof 14 comprises a longitudinal roof beam 24A and 24B, respectively, which laterally defines the roof opening 21. In the area of the B-pillars 17, the two longitudinal roof beams are connected to each other via a transverse roof beam 25. The transverse roof beam 25 serves to secure the roof panels 22A, 22B, 23A and 23B to the vehicle body 10. When the roof panels 22A, 22B, 23A and 23B are removed, the transverse roof beam 25 can be detached from the longitudinal roof beams 24A and 24B, i.e. from the vehicle structure 10, and can be stored in the vehicle body 10 or in a separate storage space together with or separately from the roof panels.

Figure 12:
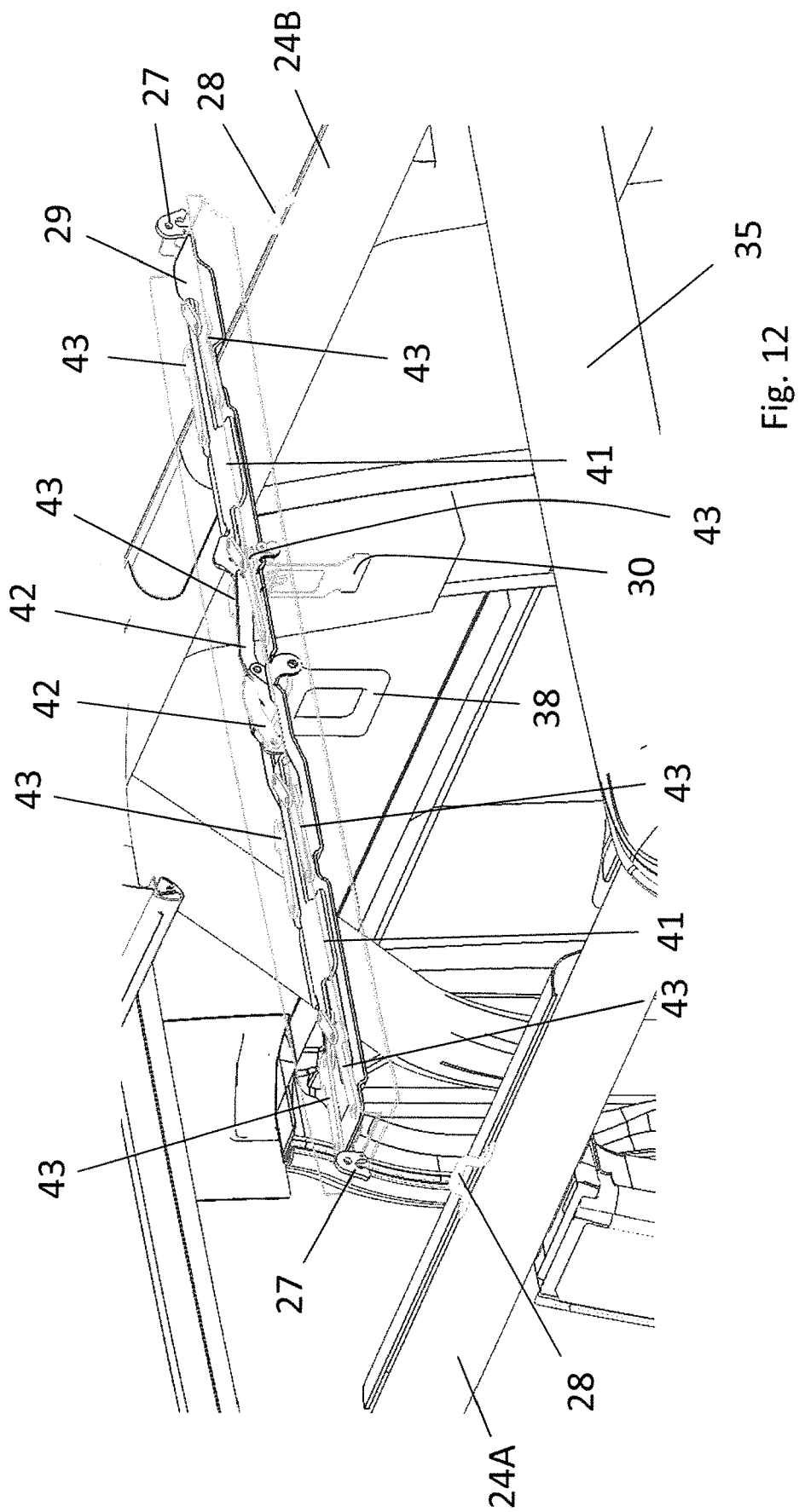
FIG. 12 shows a view corresponding to FIG. 11, but with the transverse roof beam detached.
Figure 13:
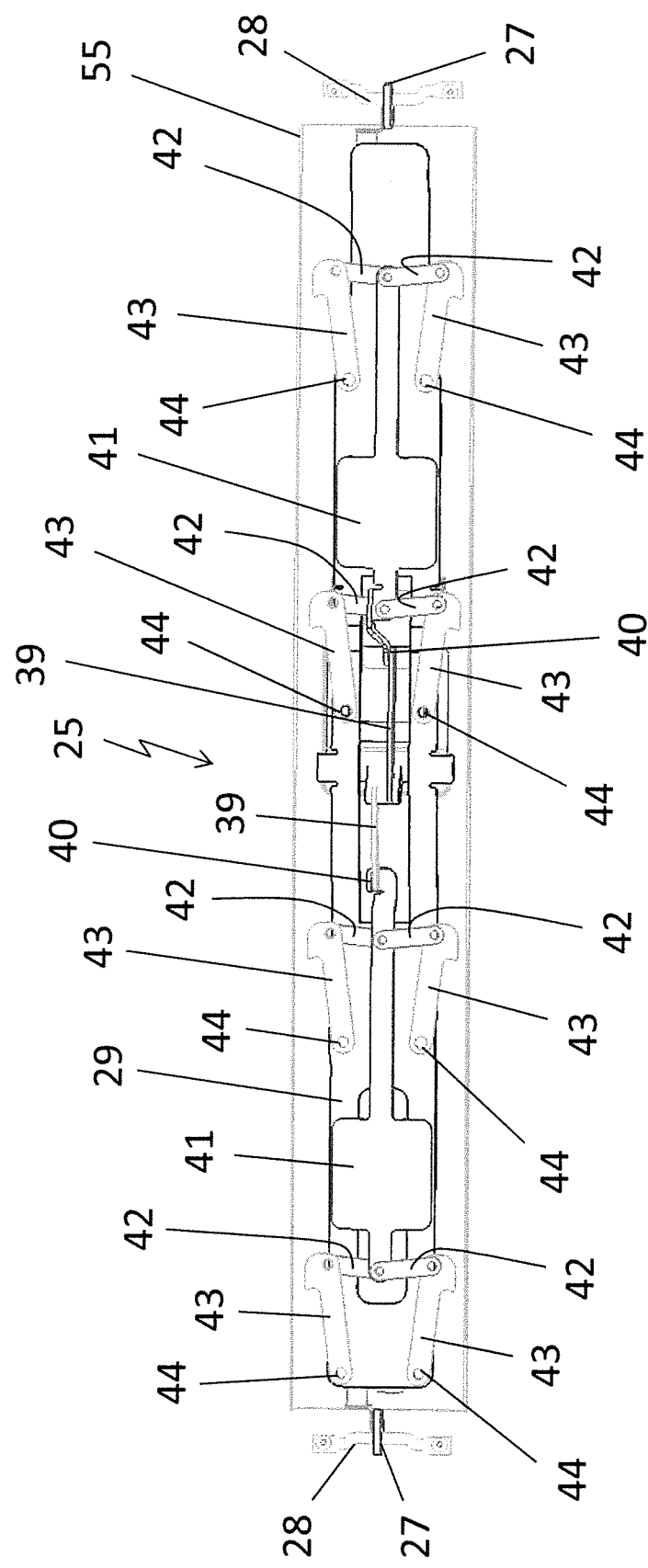
FIG. 13 shows a top view of the transverse roof beam in the latched state.
Figure 14:
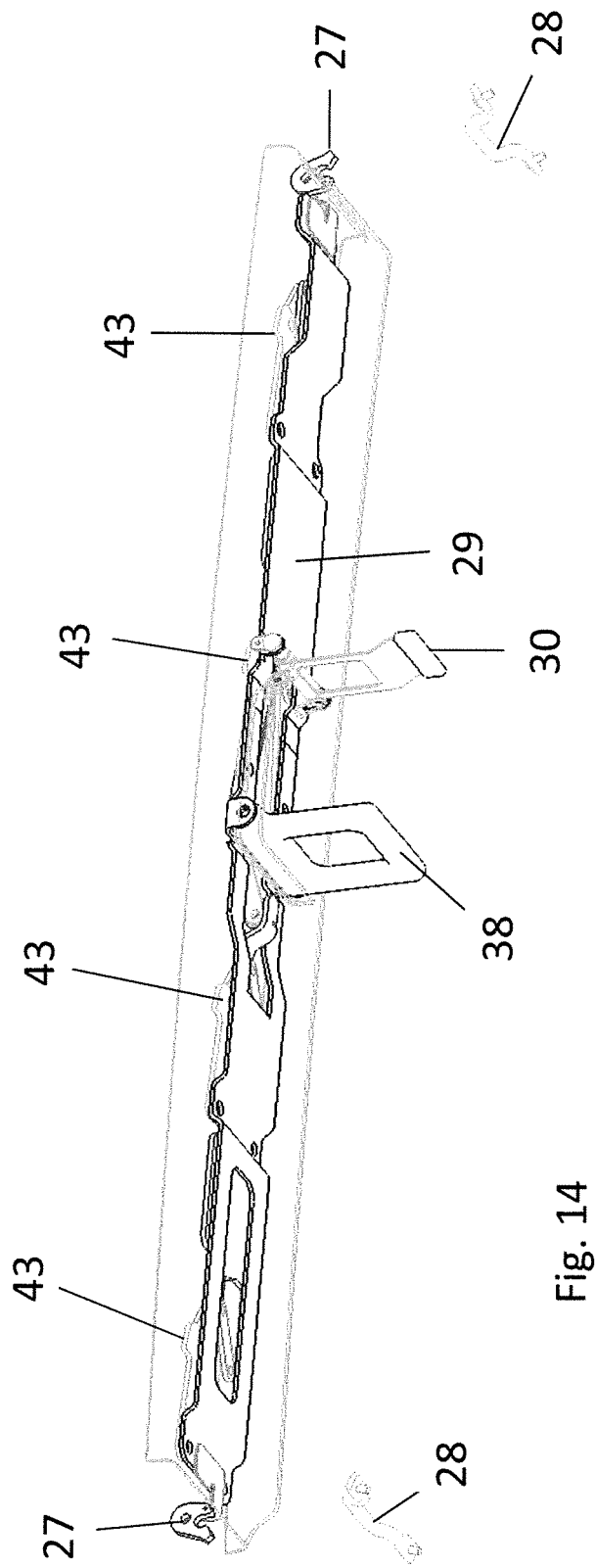
FIG. 14 shows a perspective bottom view of the transverse roof beam in the unlatched state.
Figure 15:
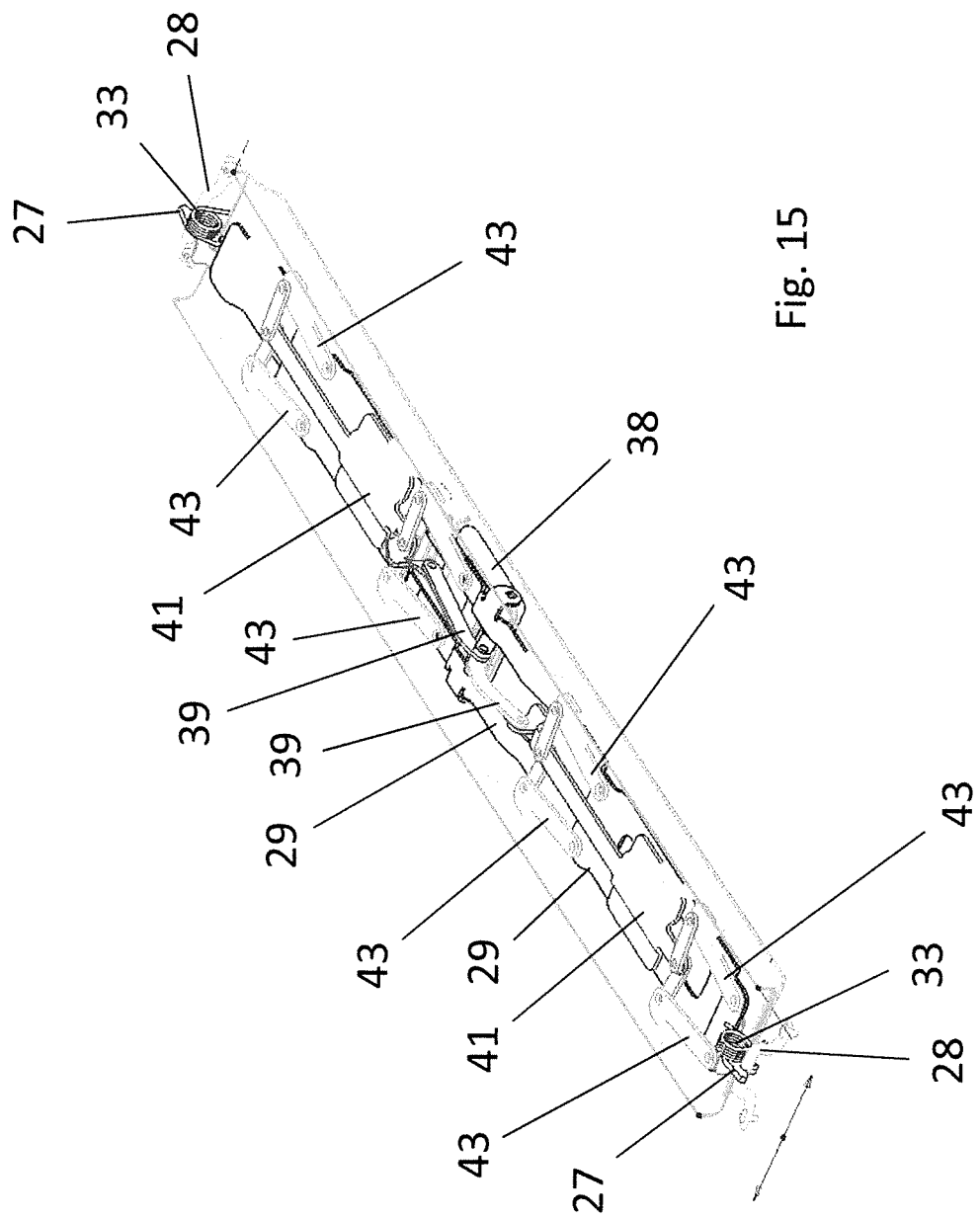
FIG. 15 shows a perspective top view of the transverse roof beam in the latched state.

For securing the transverse roof beam 25, which comprises a base support 29 and a paneling, to the longitudinal roof beams 24A and 24B, the vehicle roof 14 comprises a latching device 26 which comprises two latching elements, formed by latching hooks 27, which, when in their position secured to the vehicle body 10, are each engaged with a loop-type latching counterpart 28 which is fixed to the respective longitudinal roof beam 24A, 24B. The latching hooks 27 are pivotably mounted on the base support 29 of the transverse roof beam 25. At the underside of the base support 29, a manually operable lever 30 is pivotably mounted, to which links 32 connected to the latching hooks 27 are articulated via bearing lugs 31. When the lever 30 is operated, the links 32, which constitute a coupling device, displace the latching hooks 27. Furthermore, each latching hook 27 is provided with a pre-loading spring 33 which pre-loads the respective latching hook 27 in the direction of the release position, which is illustrated in FIG. 12. The lever 30 is further provided with a securing device, allowing the latching hooks to be secured in the latched position (cf. FIG. 15, for example).

In the case at hand, the base support 29 is a punched/bent part which extends in the transverse direction of the roof along the extension of the transverse roof beam 25.

The roof panels 22A, 22B, 23A and 23B each have a locking lug 34, by means of which they can be fixed to a front cowl 35 connecting the two A-pillars 16 and to a transverse support 36 connecting the two C-pillars 18.

At the edge facing away from the respective locking lug 34, the roof panels 22A, 22B, 23A and 23B can jointly be fixed to the transverse roof beam 25 by means of a fixing device 37. The fixing device 37 comprises a manually operable operating handle 38 which is pivotably mounted on the underside of the base support 29 and to which two displacing links 39 are articulated, each of which is connected to a slide 41 via a hinge point 40, said slide 41 being mounted in a sliding manner on the base support 29 of the transverse roof beam 25. To the slide 41, four control links 42 are articulated, whose ends facing away from the slide are each articulated to a fixing element 43 which is formed by a fixing hook and which, in turn, is pivotably mounted on the base support 29 in a hinge point 44. Thus, operation of the operating handle 38 causes the fixing hooks 43 to synchronously pivot about the hinge points 44.

Figure 16:
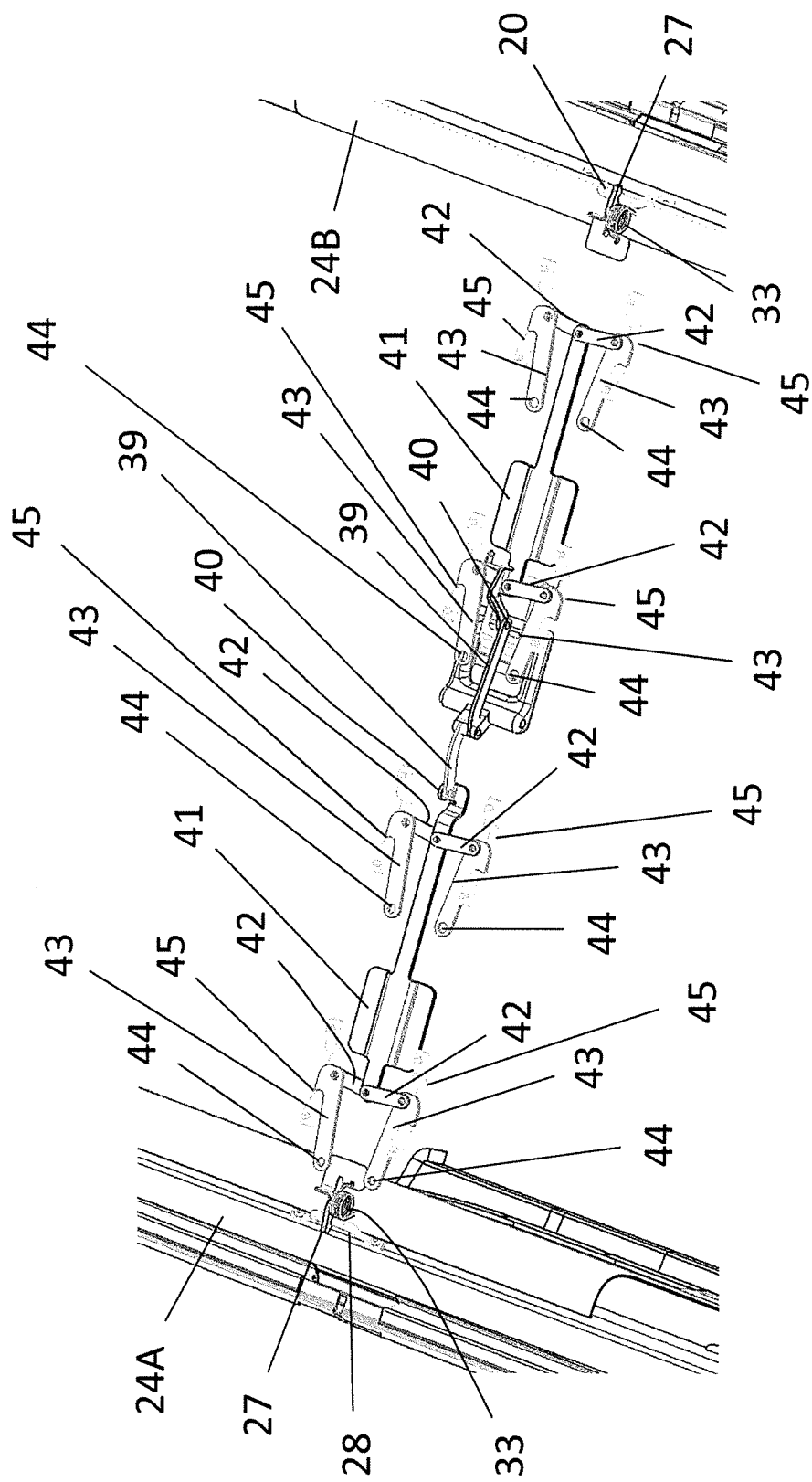
FIG. 16 shows a perspective top view of the transverse roof beam and the longitudinal roof beams, but without illustration of the roof panels and of a base support of the transverse roof beam in a state where a fixing device for the roof panels is in the locked position.
Figure 17:
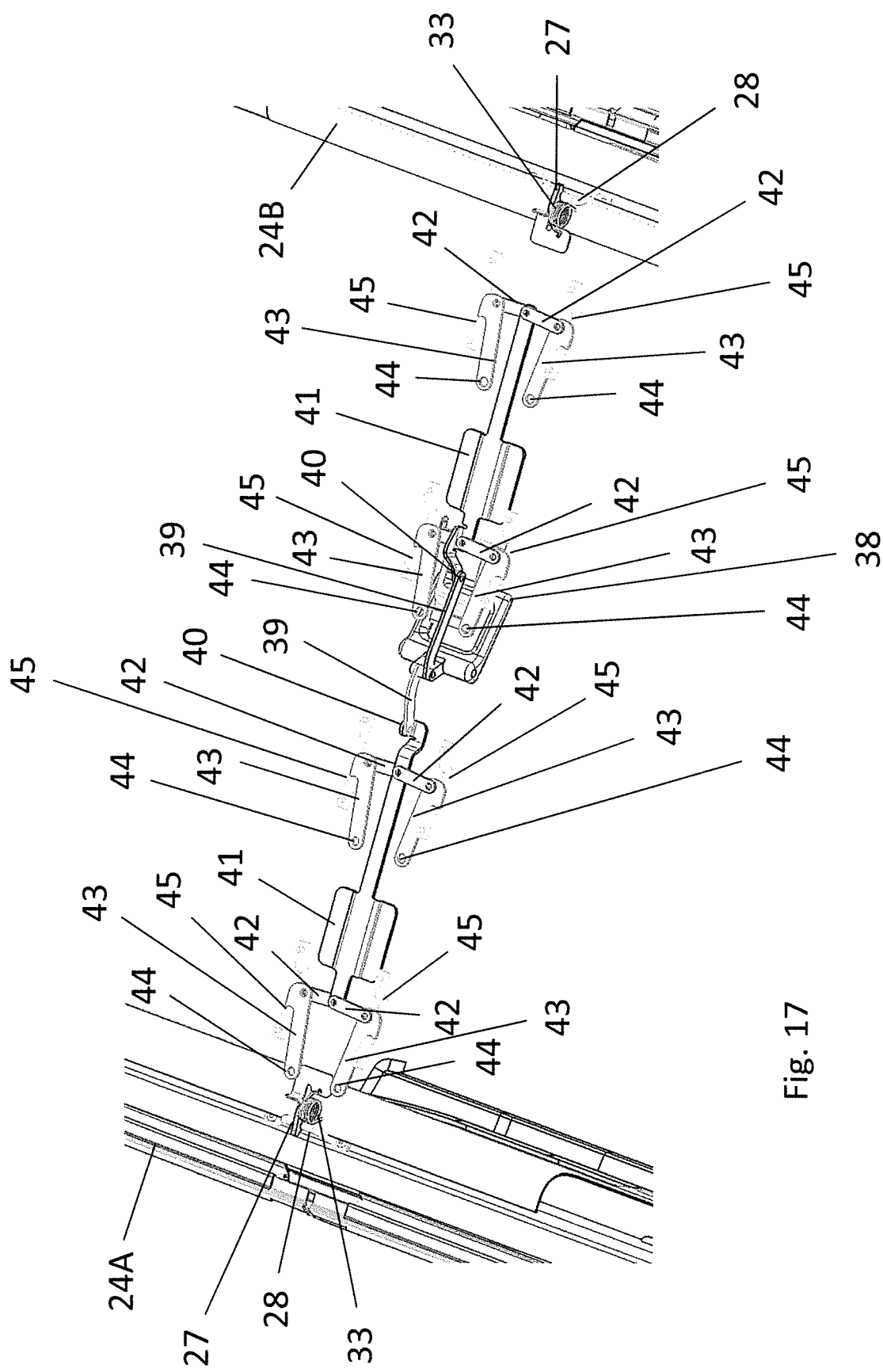
FIG. 17 shows a view corresponding to FIG. 16, but for an intermediate position of the fixing device during detachment of the roof panels.
Figure 18:
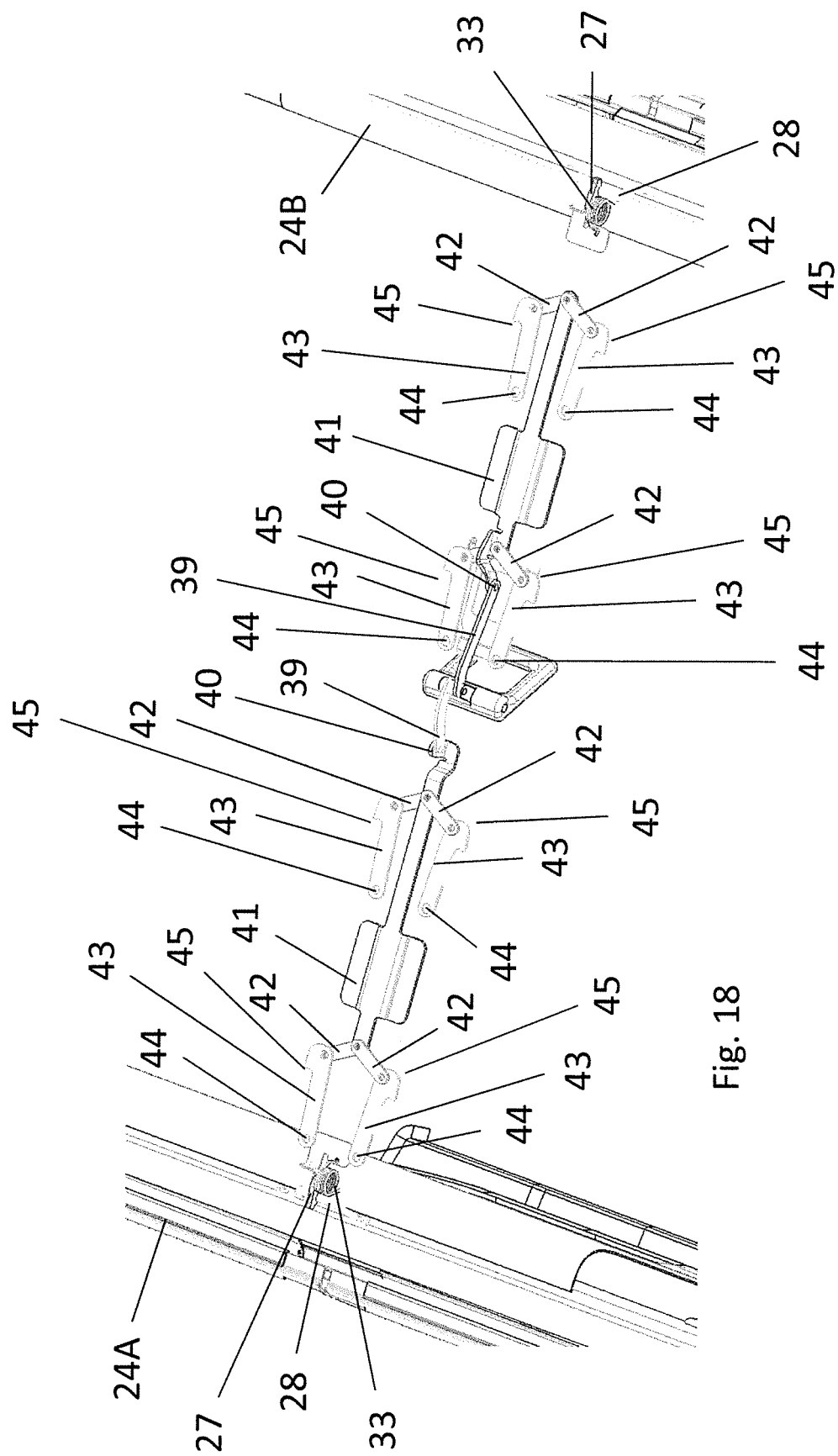
FIG. 18 also shows a view corresponding to FIG. 16, but in a second intermediate position of the fixing device during detachment of the roof panels.
Figure 19:
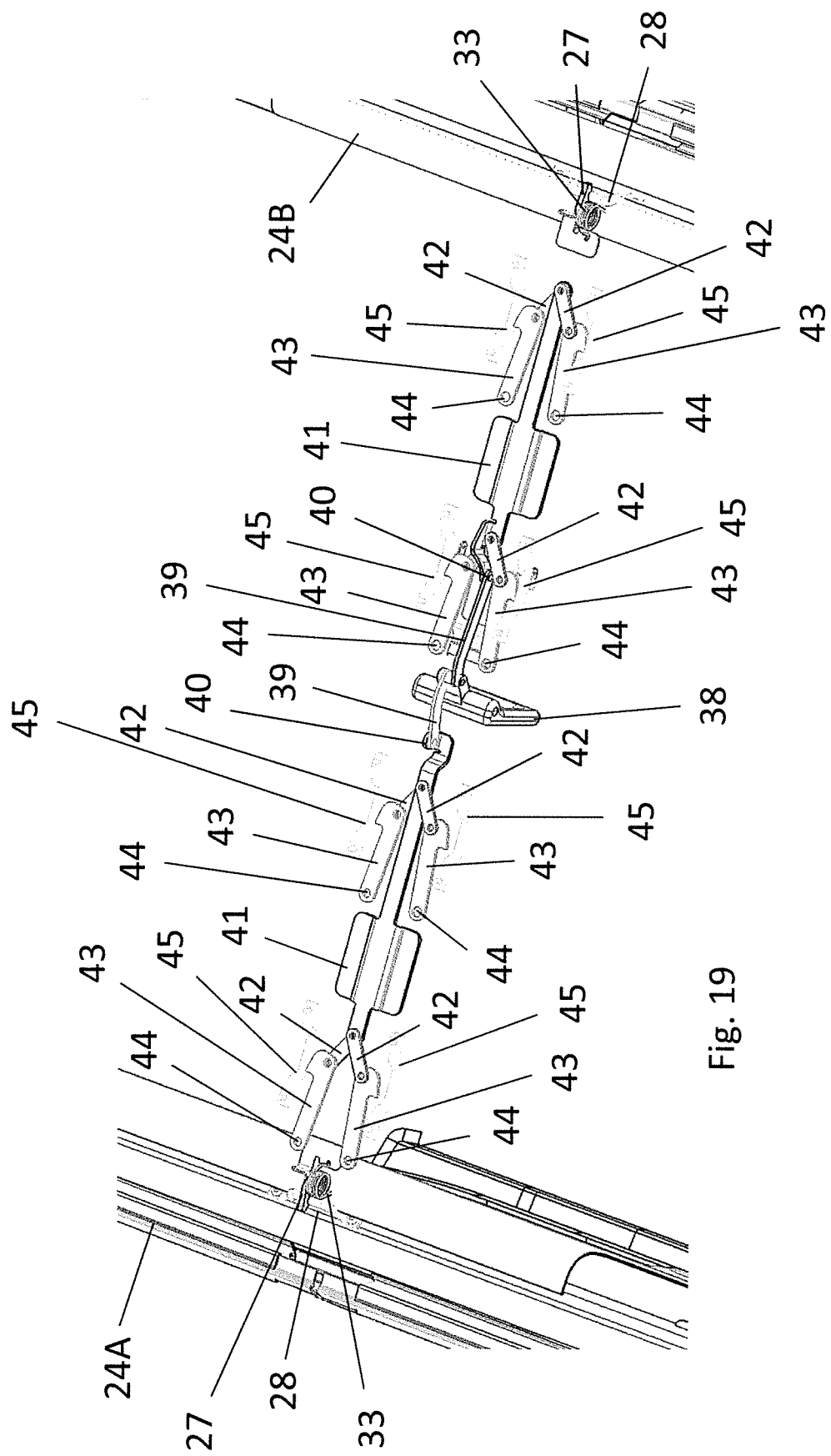
FIG. 19 shows a view also corresponding to FIG. 16, but in a release position of the fixing device.
Figure 20:
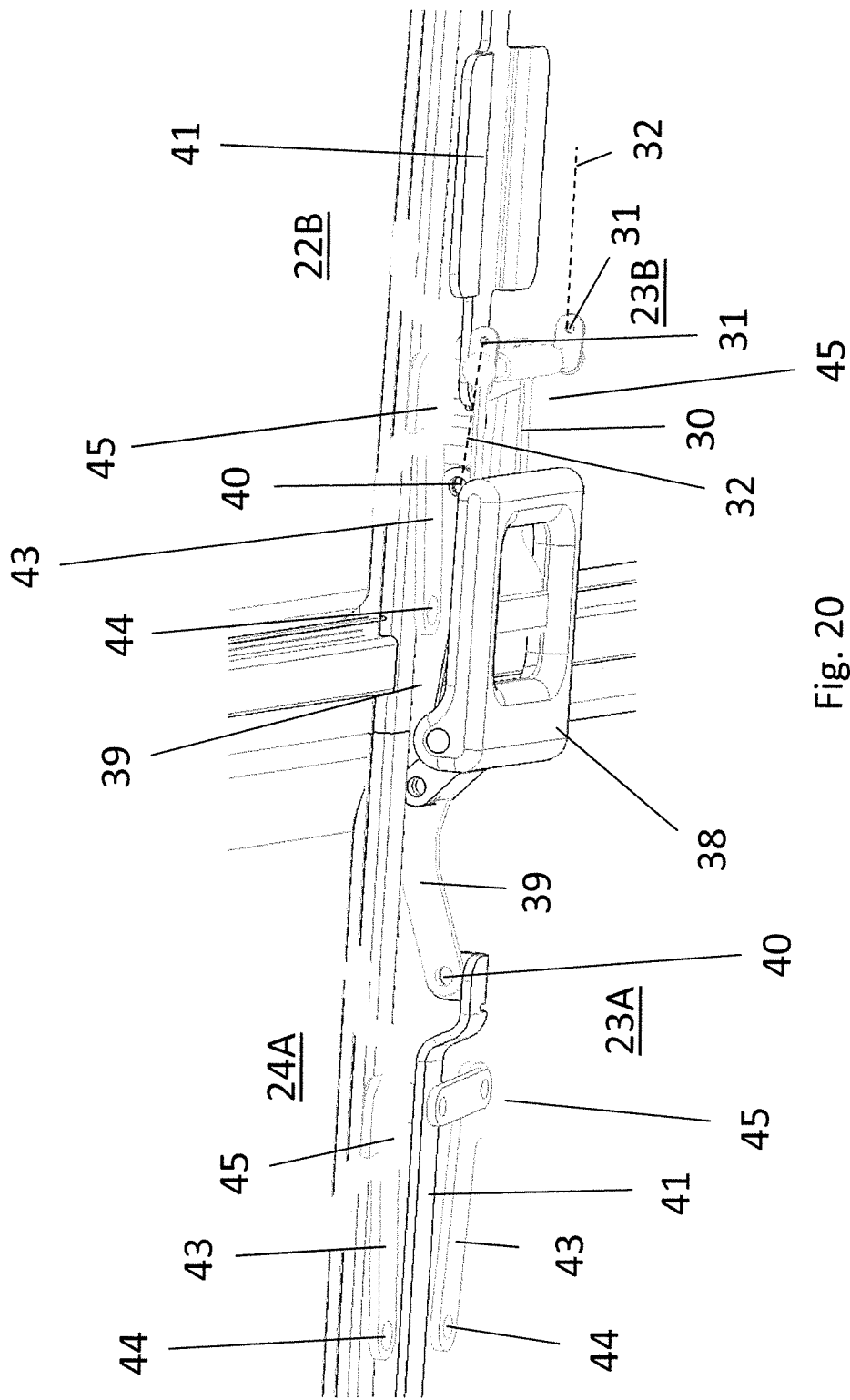
FIG. 20 shows a bottom view of the fixing device and of the transverse roof beam in the area of an operating handle in the locked position of the fixing device.
Figure 21:
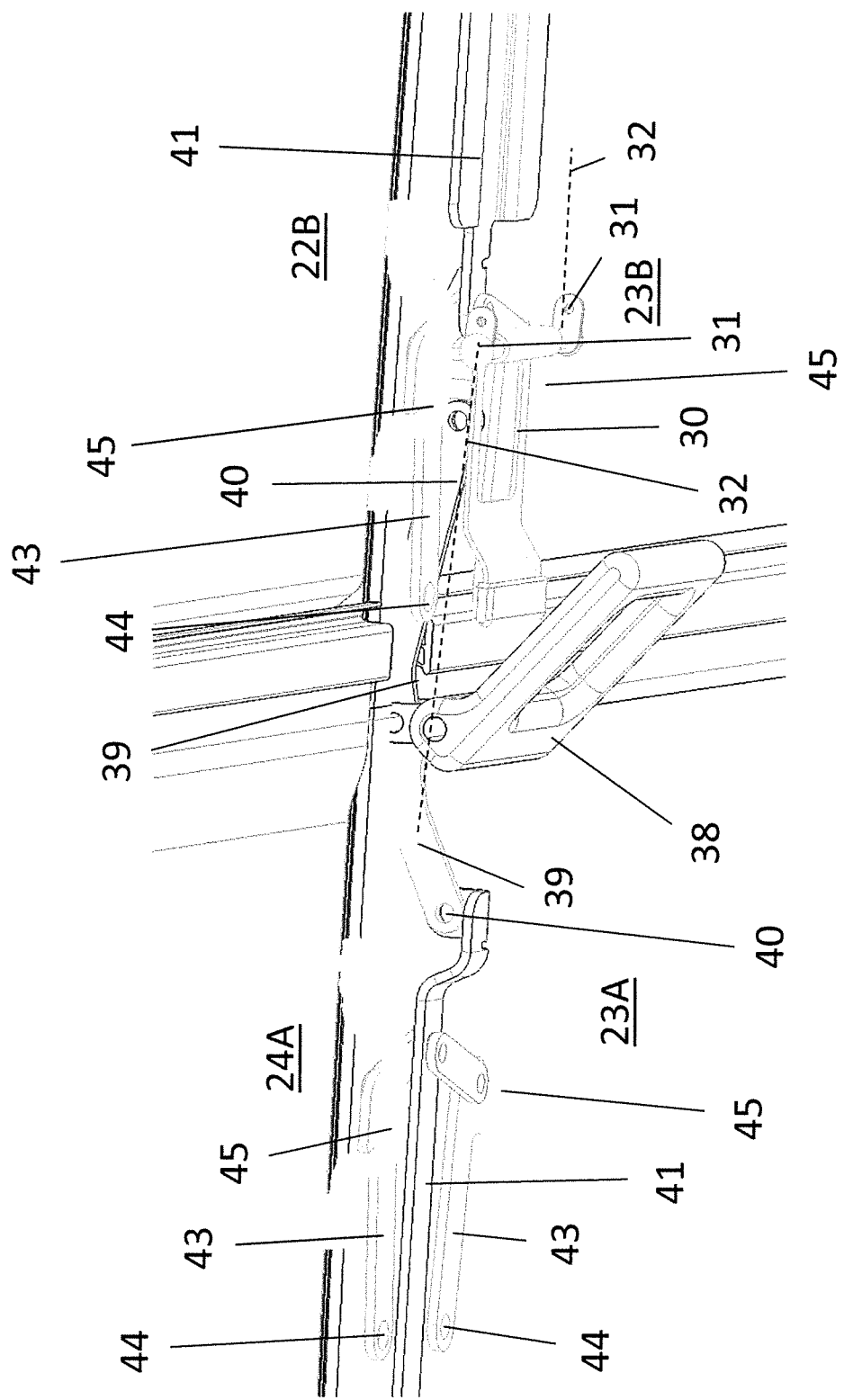
FIG. 21 shows a view corresponding to FIG. 20, but in an intermediate position of the operating handle.
Figure 22:
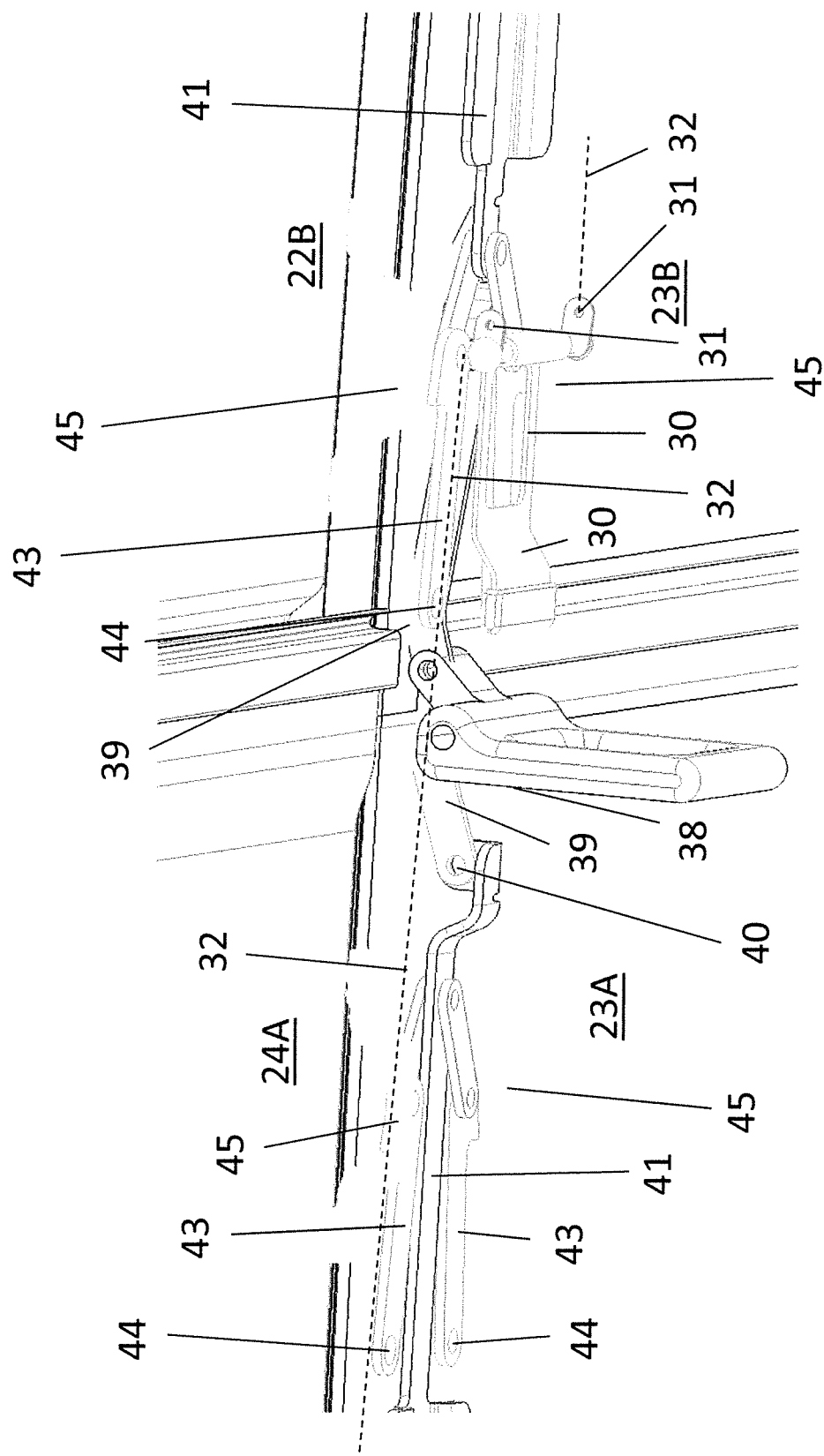
FIG. 22 also shows a view corresponding to FIG. 20, but in a release position of the operating handles and of the fixing device.
Figure 23:
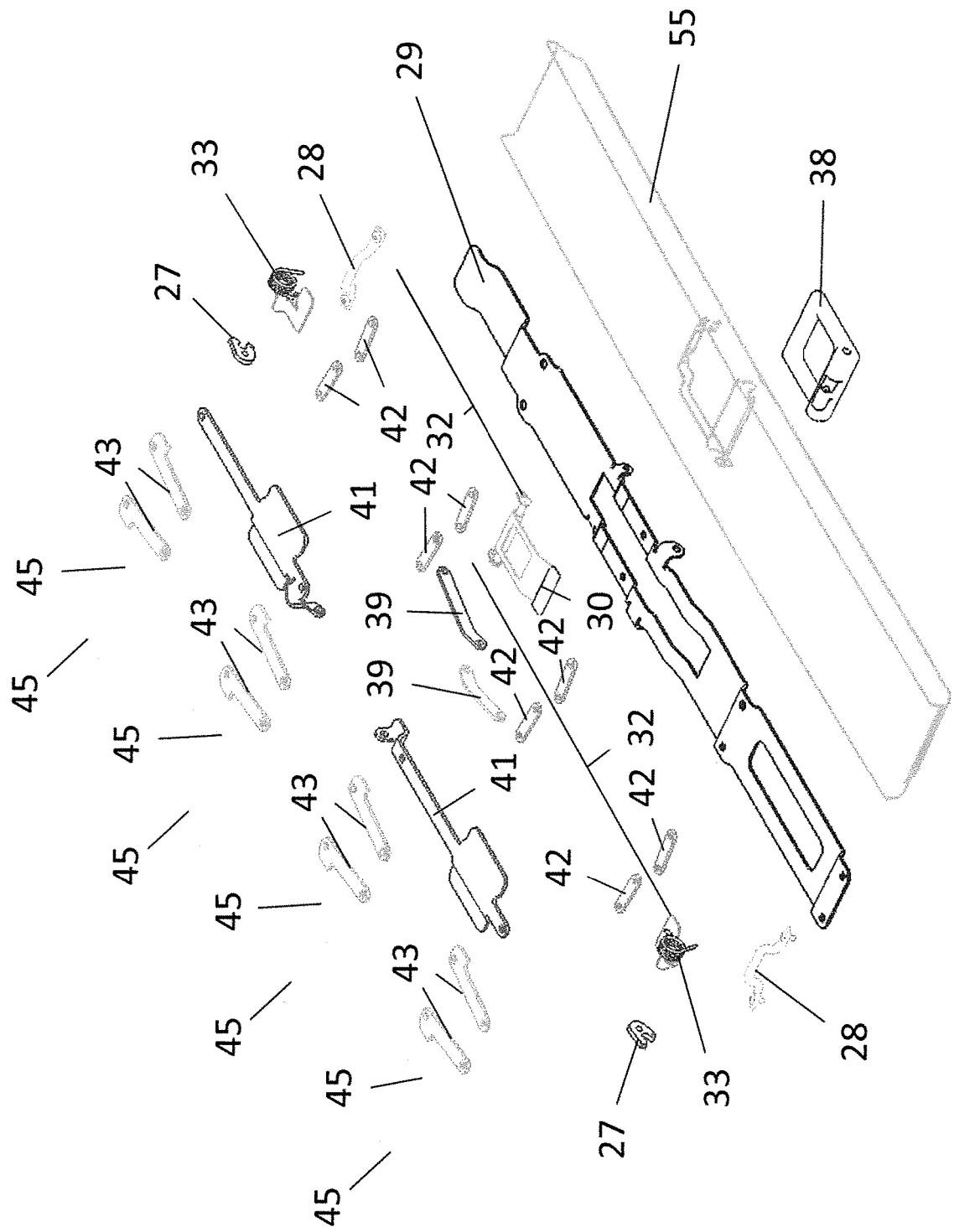
FIG. 23 shows an exploded view of the transverse roof beam with fixing counterparts and latching counterparts.
Figure 24:
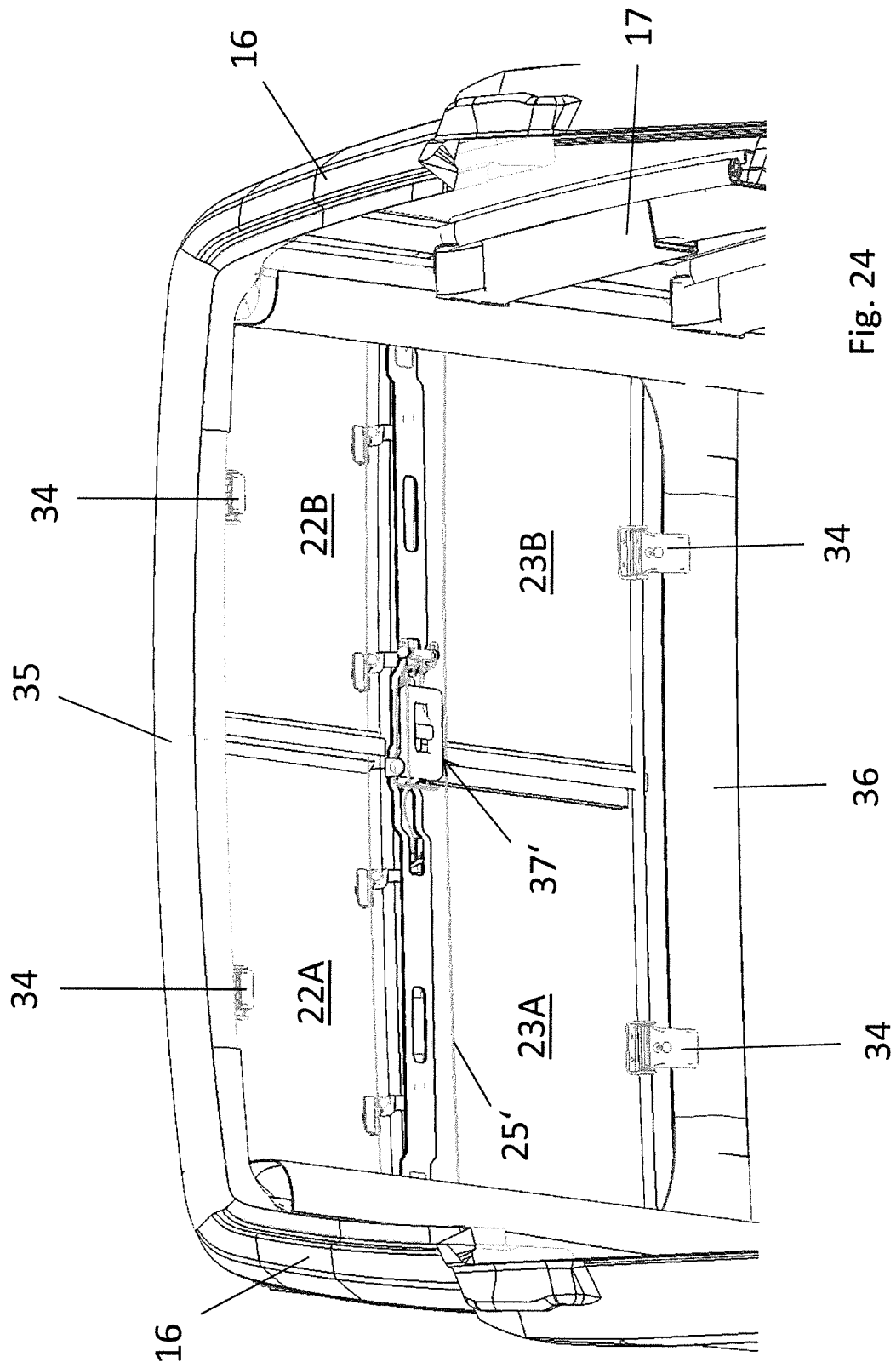
FIG. 24 shows a bottom view of an alternative embodiment of a vehicle roof according to one approach in the closed state.
Figure 25:
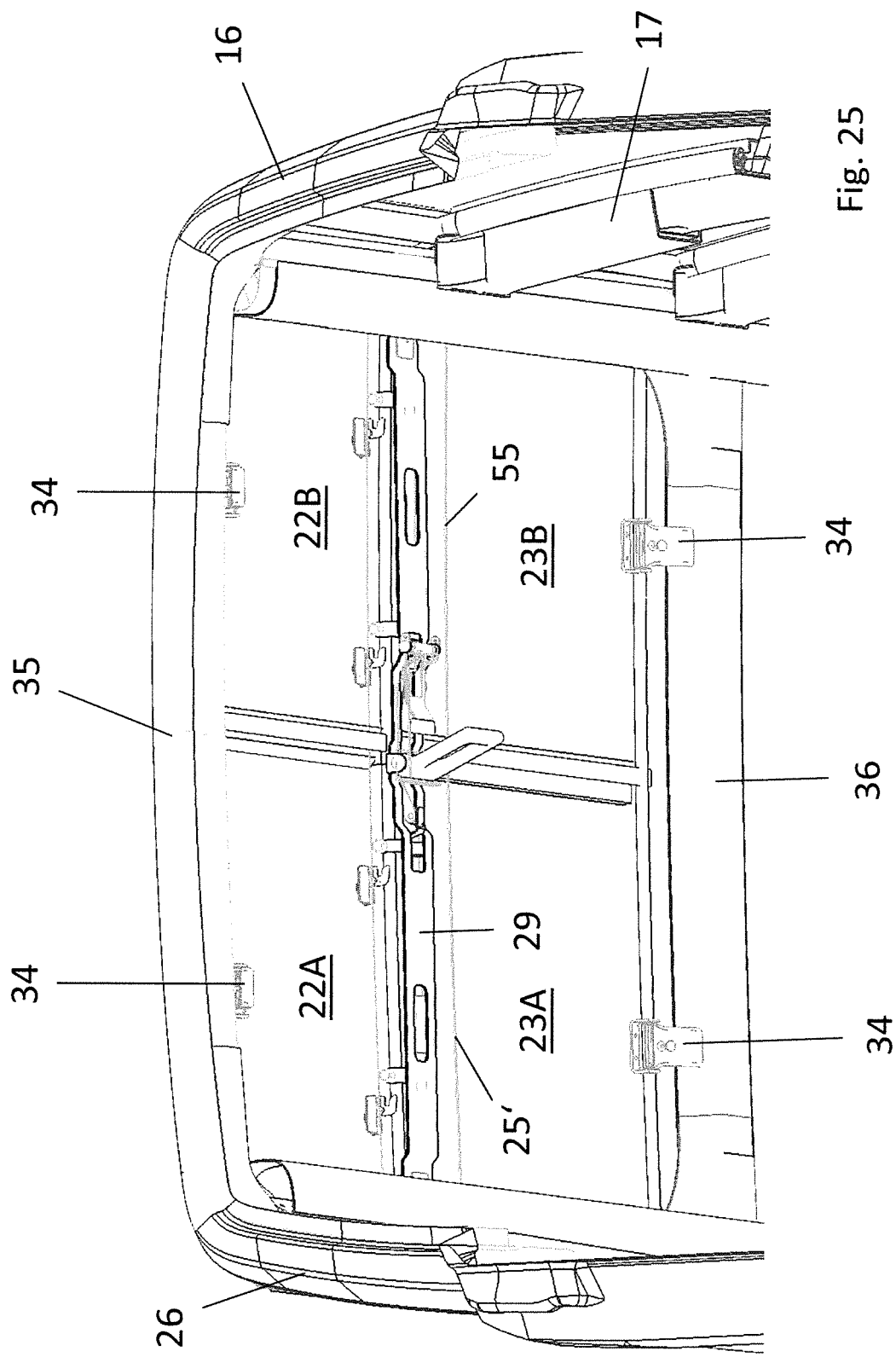
FIG. 25 shows a view of the vehicle roof corresponding to FIG. 24, but with the roof panels unsecured.
Figure 26:
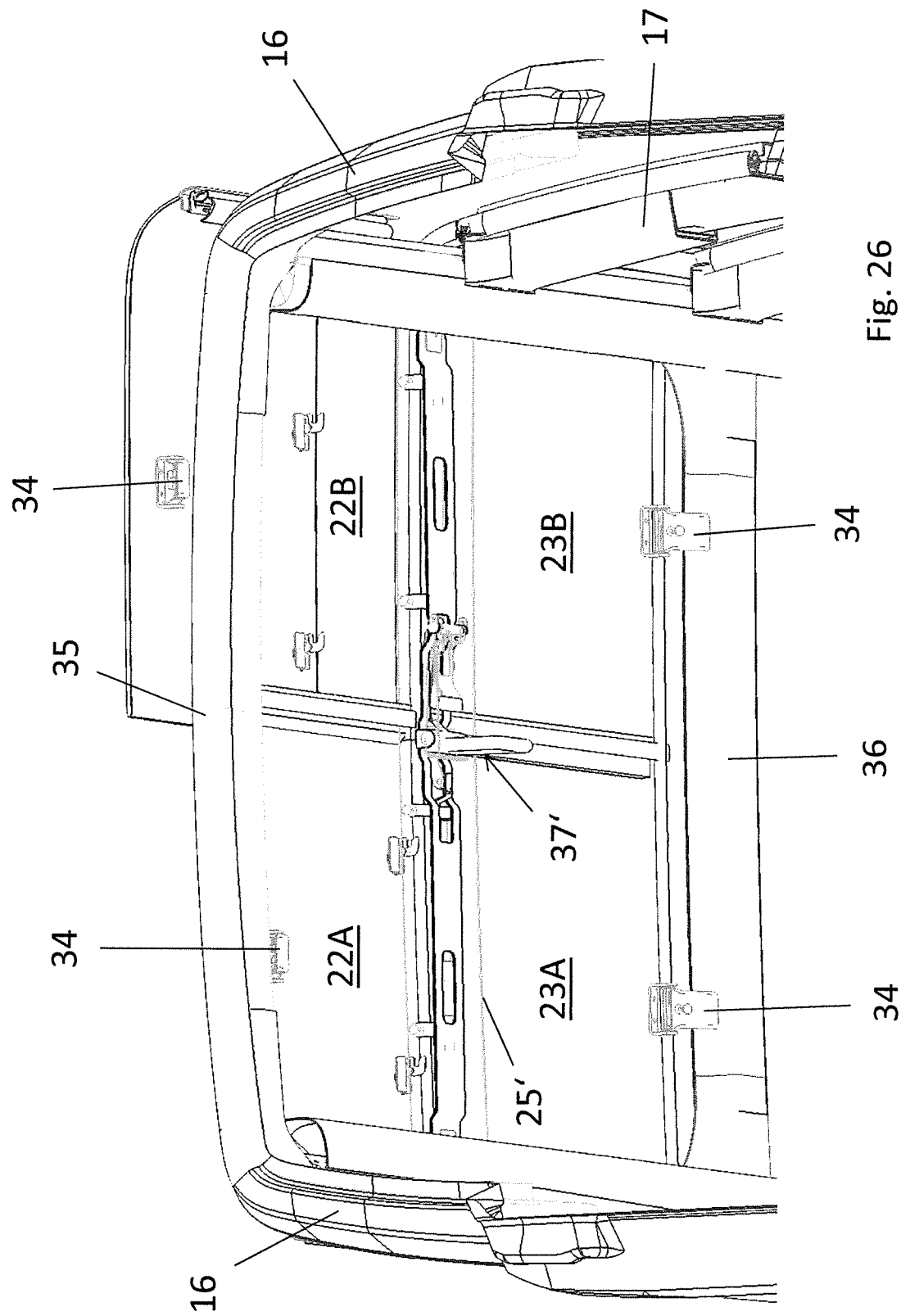
FIG. 26 also shows a view of the vehicle roof corresponding to FIG. 24, but in a state where one roof panel is removed.
Figure 27:
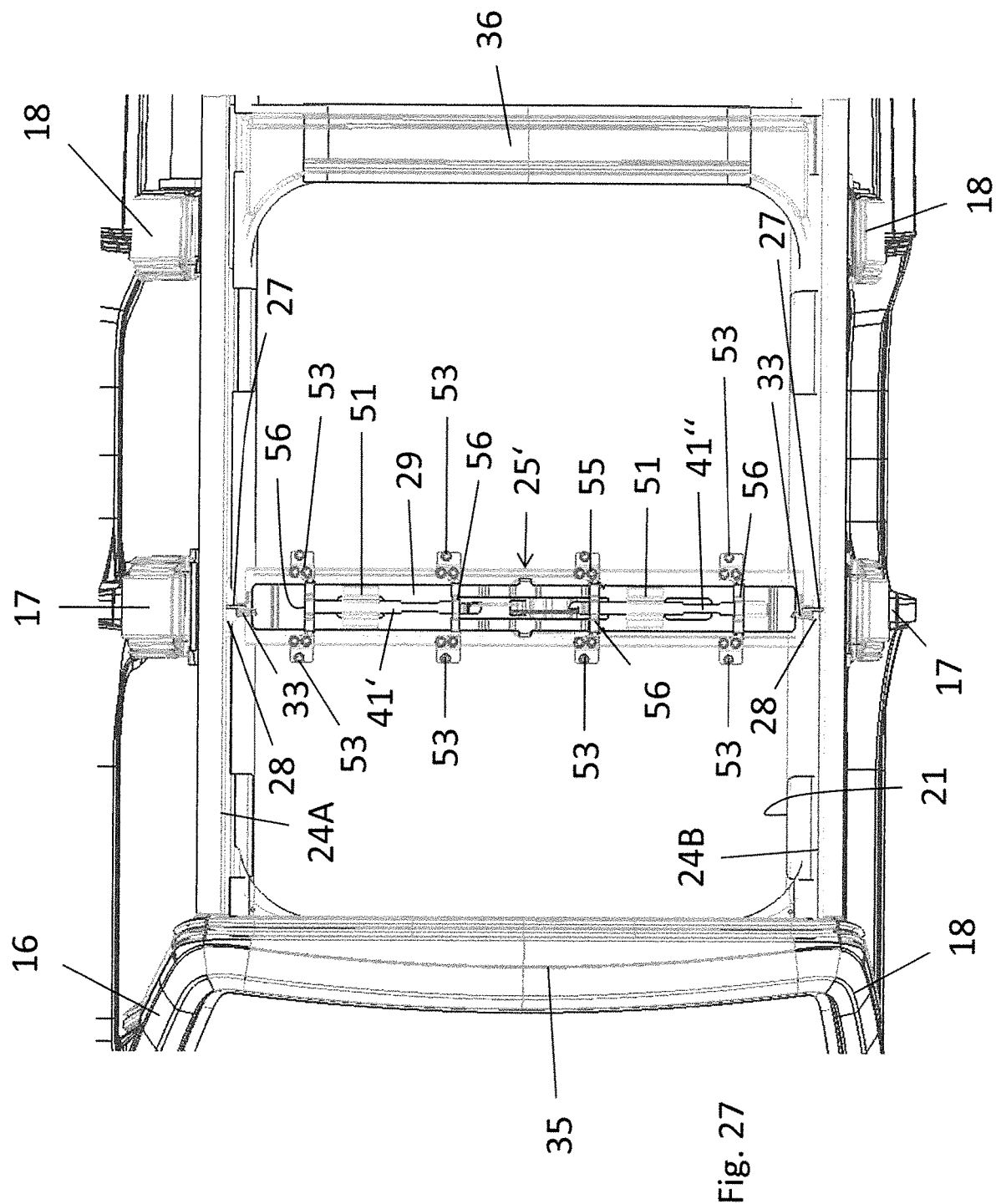
FIG. 27 shows a top view of the vehicle roof of FIG. 24 in the closed position, but without illustration of the roof panels.
Figure 28:
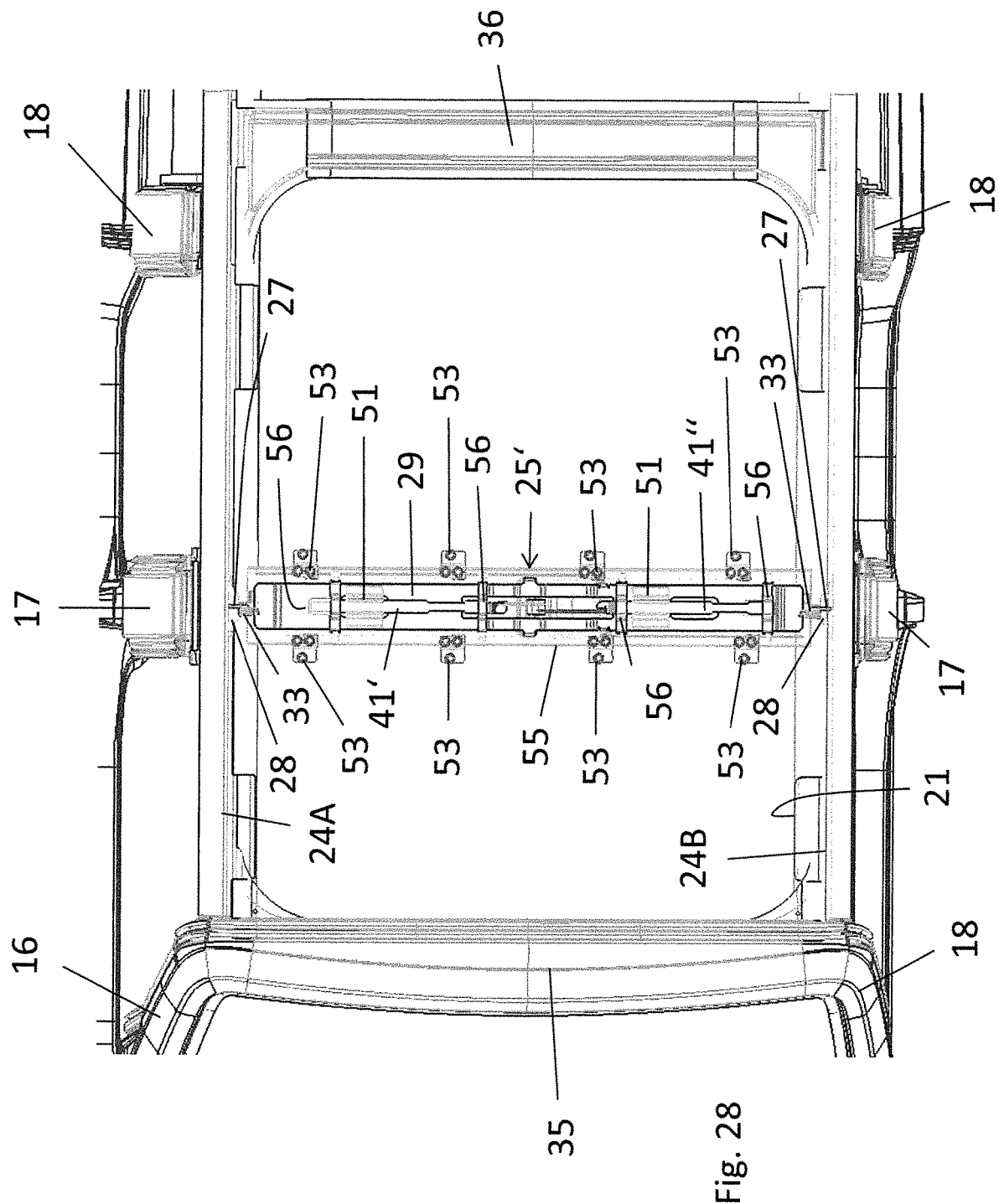
FIG. 28 shows a view of the vehicle roof corresponding to FIG. 27, but with the roof panels unsecured, again without illustration of the roof panels.
Figure 29:
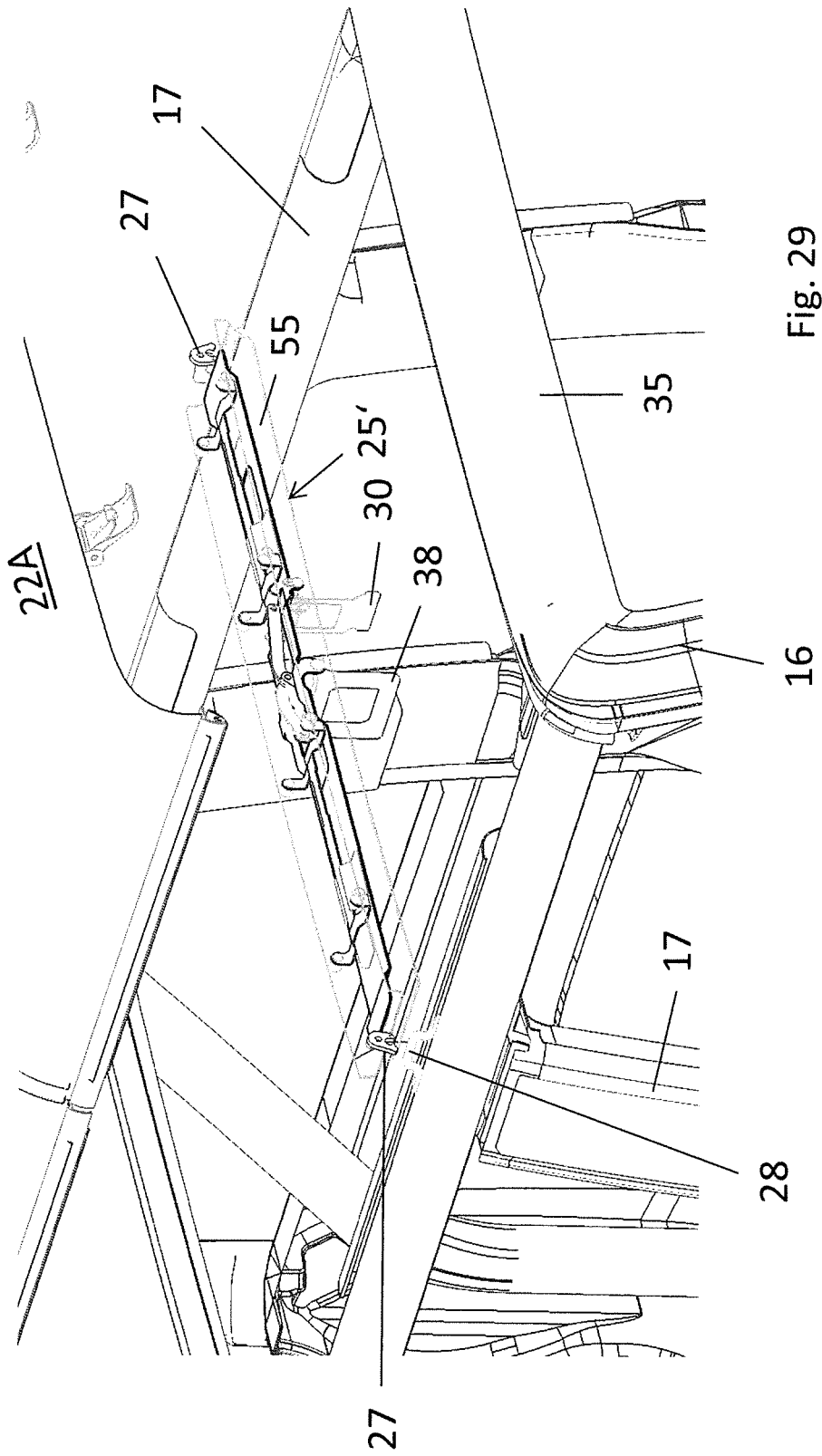
FIG. 29 shows a perspective view of the vehicle roof of FIG. 24 with the roof panels removed and the transverse roof beam removed.
Figure 30:
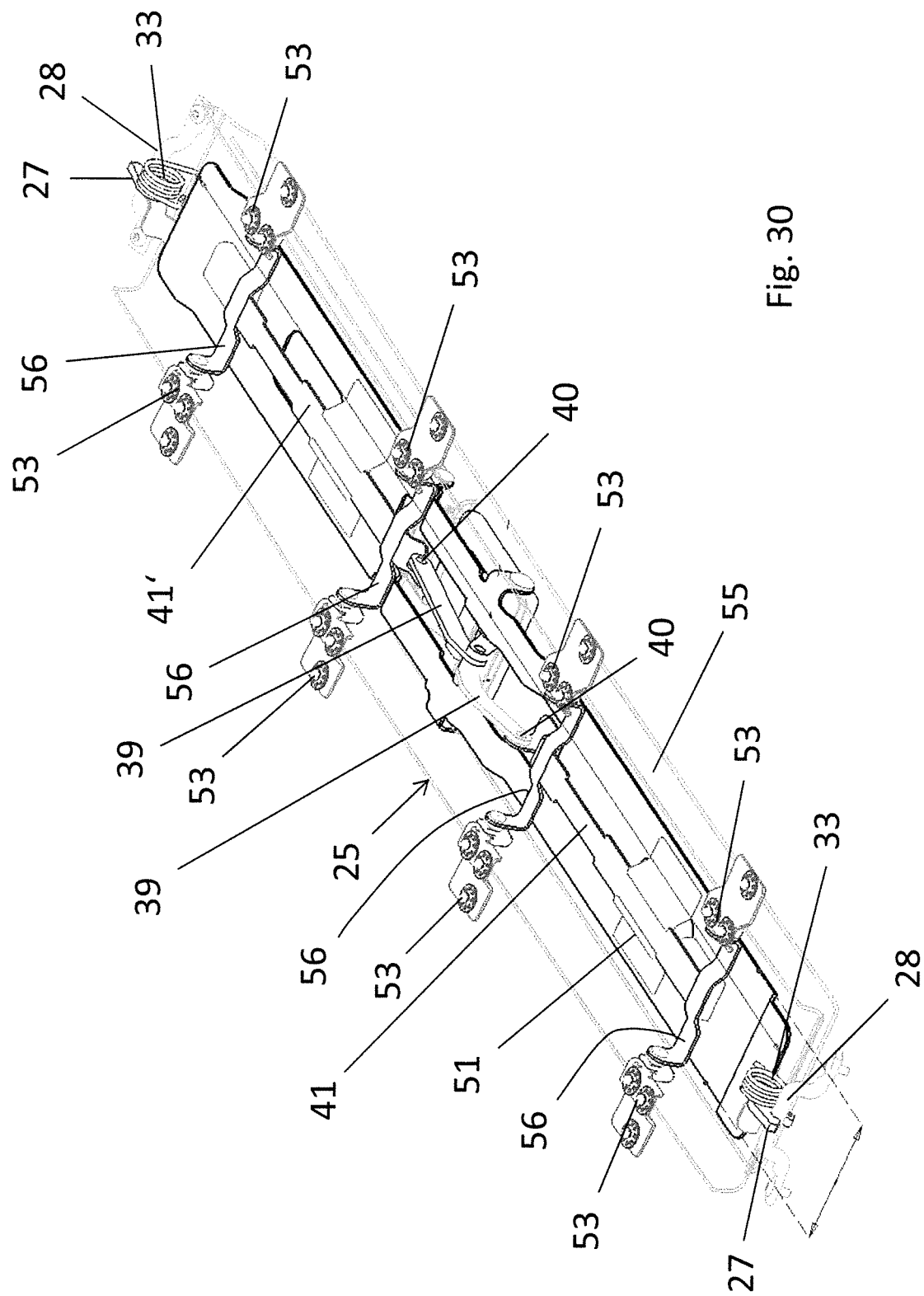
FIG. 30 shows a perspective view of the transverse roof beam in the state mounted on the vehicle roof and in the locked position with respect to the roof panels.
Figure 31:
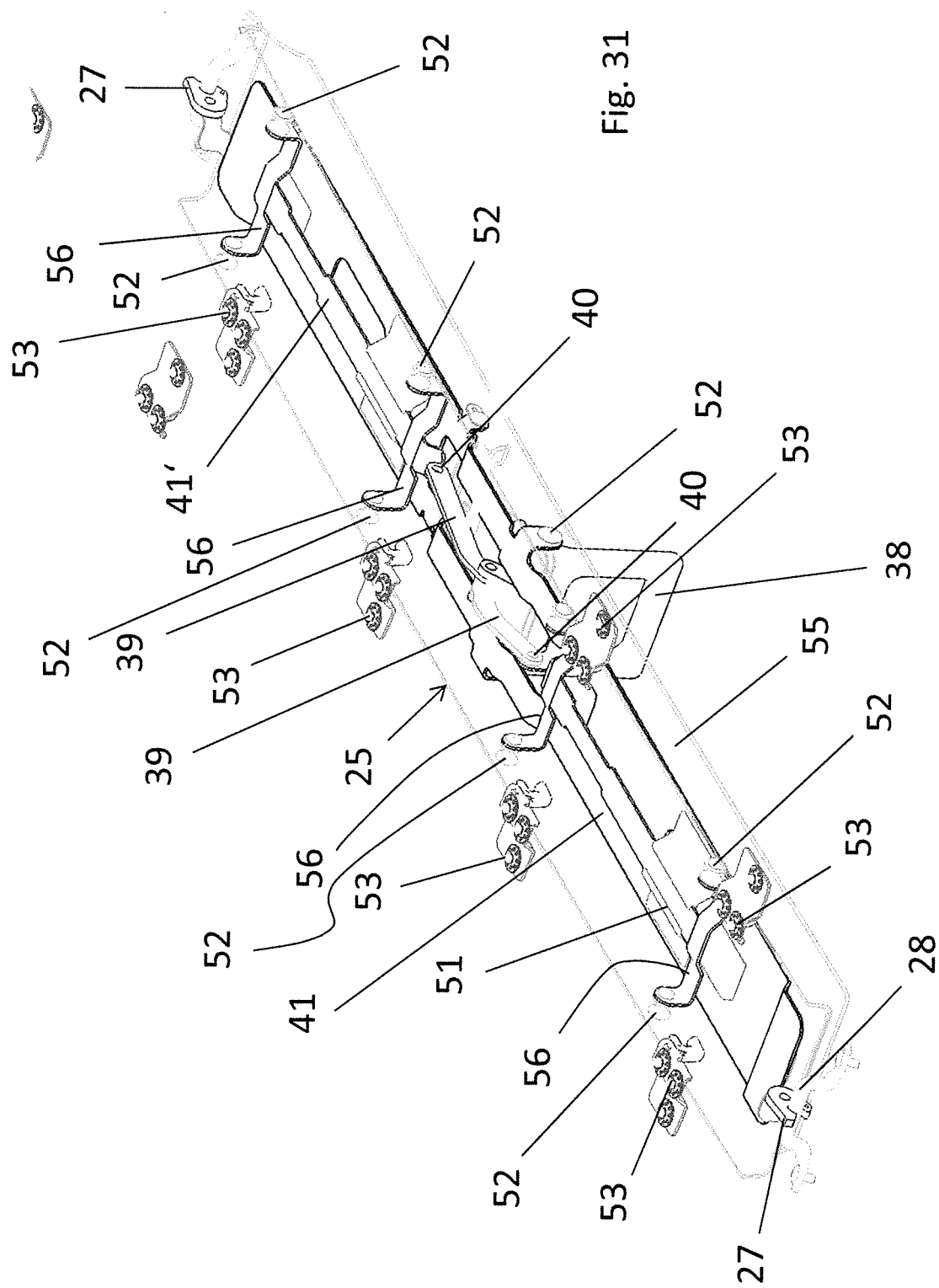
FIG. 31 shows a perspective view of the transverse roof beam in the state mounted to the vehicle roof and in the release position with respect to the roof panels.
Figure 32:
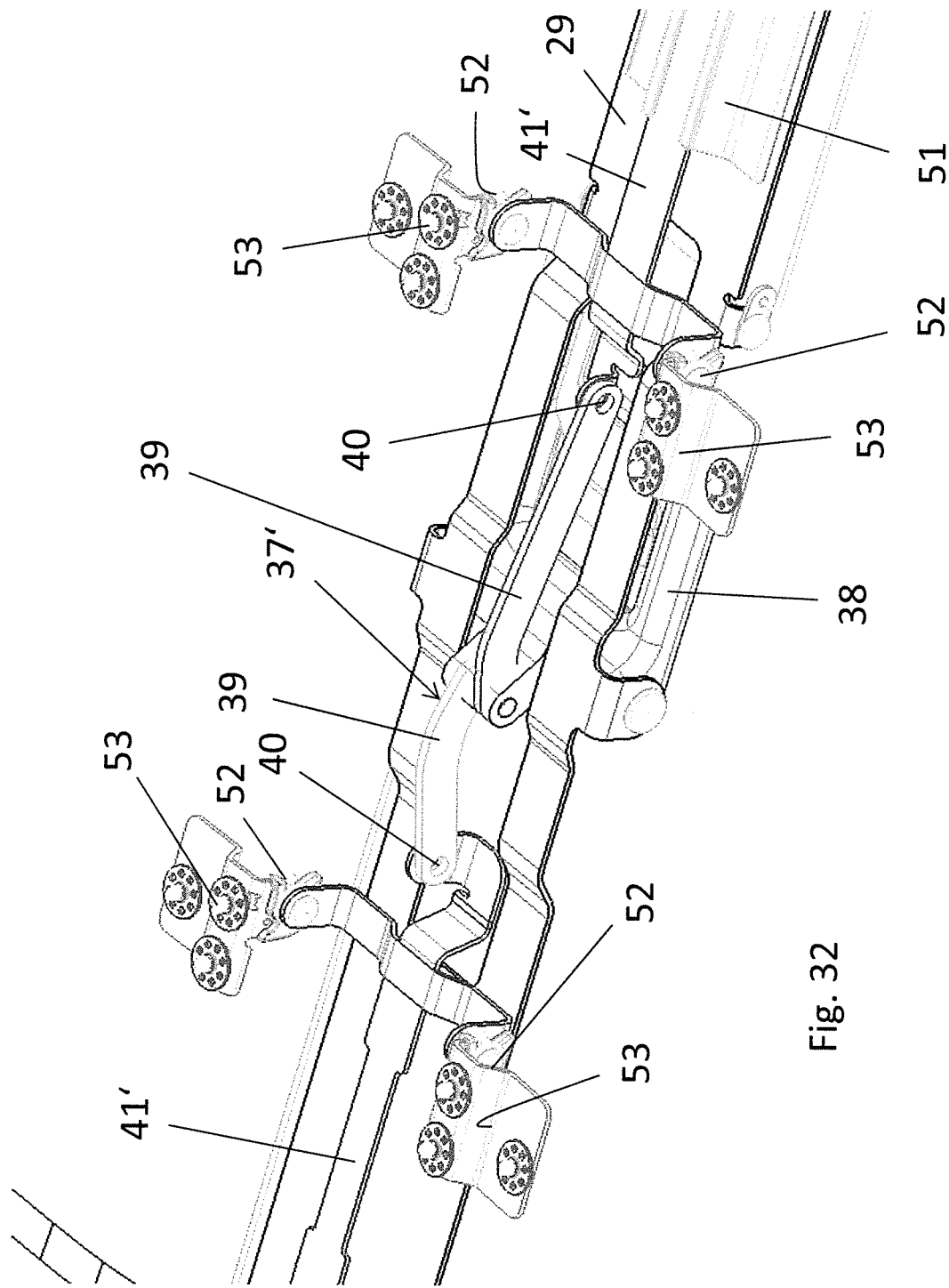
FIG. 32 shows an enlarged view of displacing kinematics of the transverse roof beam in the locked position with respect to the der roof panels.
Figure 33:
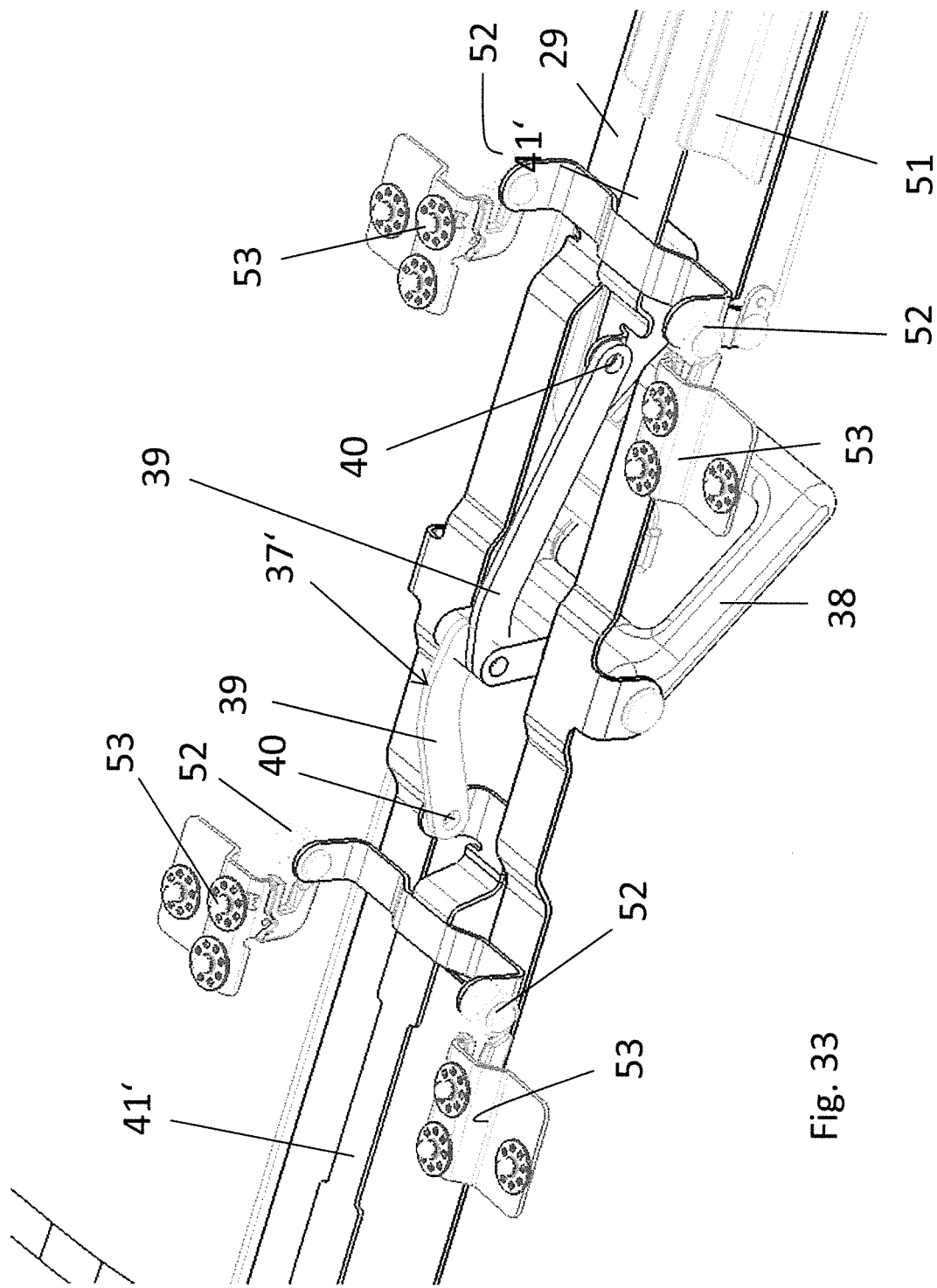
FIG. 33 shows a view corresponding to FIG. 32 with the displacing kinematics in an intermediate position.
Figure 34:
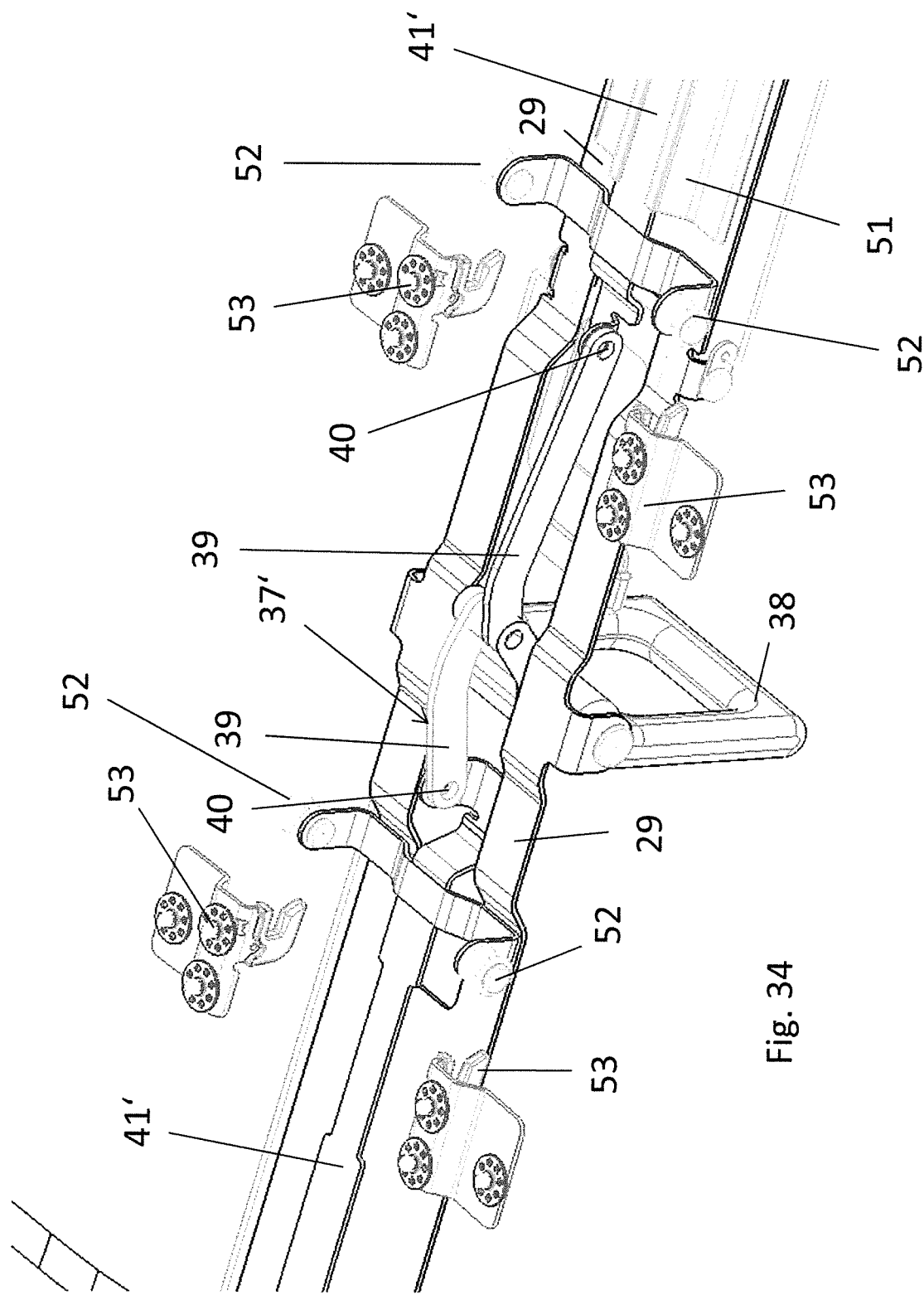
FIG. 34 also shows a view corresponding to FIG. 32, but with the displacing kinematics in the release position.
Figure 35:
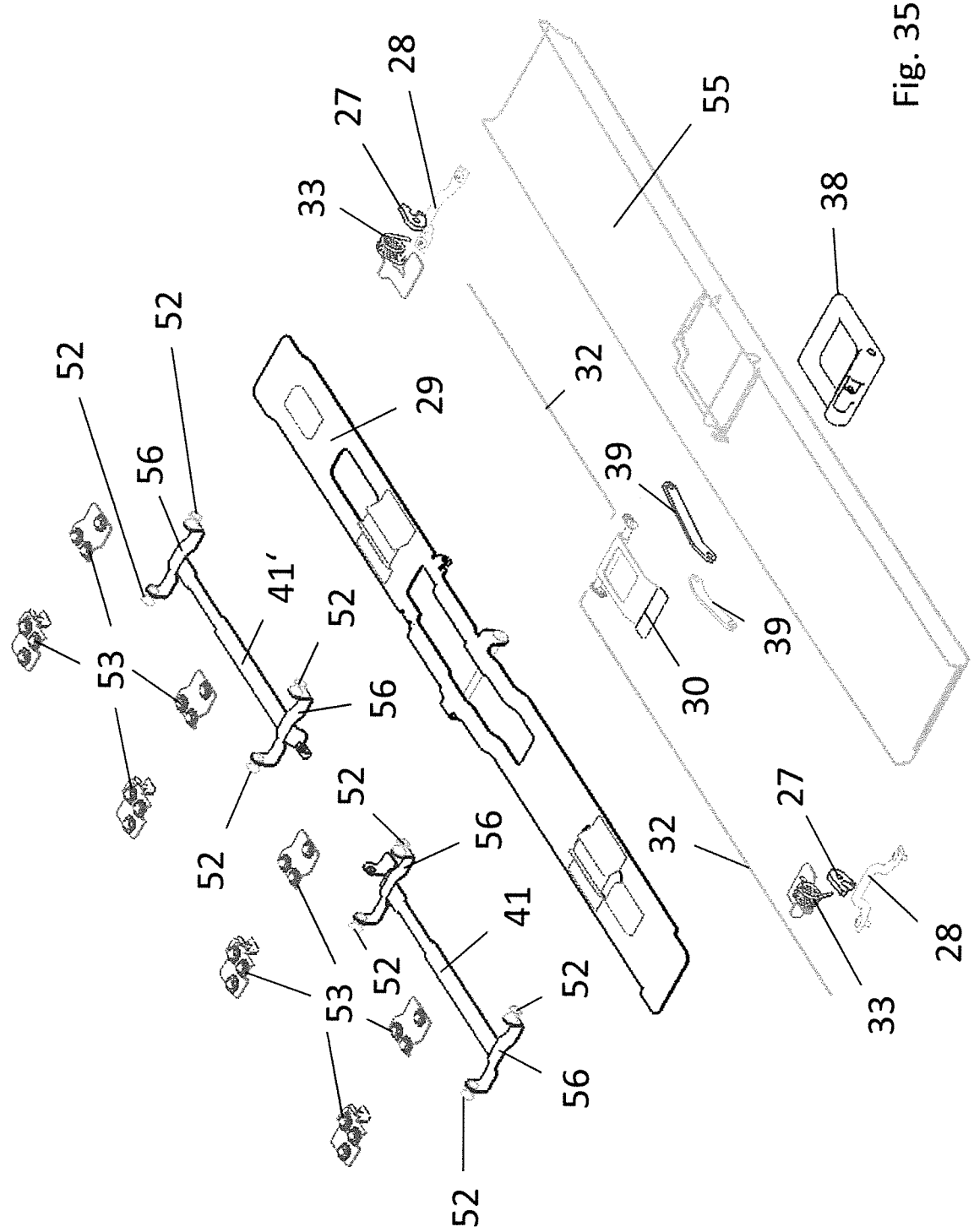
FIG. 35 shows an exploded illustration of the transverse roof beam together with fixing counterparts and latching counterparts.

For securing the roof panels 22A, 22B, 23A, and 23B to the vehicle body, they each have two loops 45 at their underside, said loops 45 serving as fixing counterparts for the fixing hooks 43. As can be seen in FIG. 16 in particular, the fixing hooks 43 are engaged with the loops 45 when they are in their locked position and the panels 22A, 22B, 23A and 23B are mounted. In this engaged or locked position, the control links 42 are in an over-center position, which means that an opening torque unintentionally exerted on the fixing hooks 43 introduces a force into the slide 41 that acts in the direction of the locked position of the fixing device 37. The control links 42 are moved from their over-center position (FIG. 17) simply by operating the operating handle 38, continued pivoting of the operating handle 38 causing the fixing hooks 43 to be pivoted into their release position, allowing the roof panels 22A, 22B, 23A and 23B to be removed from the roof body. It is possible to not remove all roof panels and to re-secure the roof panels remaining on the roof by shifting the fixing device 37 into the locked position.

When all roof panels 22A, 22B, 23A and 23B have been removed, the transverse roof beam 25 can be detached from the longitudinal roof beams 24A and 24B and be removed from the vehicle body 10 by operation of the lever 30, under which the operating handle 38 engages when the fixing device 37 is in the locked position.

Owing to the pre-loading springs 33, when the lever 30 is in the in der release position, the latching hooks 27 are in an orientation that allows precise engagement of the loop-type latching counterparts 28 into the latching hooks 27 during placement of the transverse roof beam 25 onto the longitudinal roof beams 24A and 24B. By pivoting the lever 30 against the base support 29, the transverse roof beam 25 can subsequently be secured to the longitudinal roof beams 24A and 24B.

In FIGS. 24 to 35, an alternative embodiment of a vehicle roofs is illustrated, which largely corresponds to the vehicle roof of FIGS. 1 to 23, but differs there-from in the design of the fixing device 37' for the roof panels 22A, 22B, 23A and 23B.

Similar to the embodiment described above, the fixing device 37' comprises an operating handle 38 which is pivotably mounted on the base support 29 and to which two displacing links 39 are articulated, whose ends facing away from the operating handle 38 are connected to a slide 41' via a hinge point 40, said slide 41' being mounted in a guide 51 formed on the base support 29, in which it can slide in the longitudinal direction of the transverse roof beam 25'. The two slides 41' each have two transverse loops 56 which are substantially U-shaped and whose free legs each carry a fixing pin 52, which can be a roller and constitutes a fixing element which, when the roof panels 22A, 22B, 23A and 23B are in the mounted state, interacts with a respective hook-type fixing counterpart attached to the underside of the respective roof panel 22A, 22B, 23A, 23B. Pivoting the operating handle 38 thus causes the fixing pins 52 to be displaced in relation to the base support 29 and to selectively engage into the hook-type fixing counterparts 53 of the roof panels 22A, 22B, 23A and 23B or be moved out of them.

Otherwise, the vehicle roof 14' corresponds to the one according to FIGS. 1 to 23.

The roof panels 22A, 22B, 23A and 23B, when in their state mounted on the vehicle body 10, engage over the longitudinal roof beam 24A, 24B with each of their outer edges and rest on the respective longitudinal roof beam 24A, 24B via a respective weather strip. Roof panel 22A has a weather strip 46 at its inner edge, on which roof panel 22B rests. The two roof panels 23A and 23B each have a weather strip 46 at their front edge, on which roof panel 22A and roof panel 22B rest, respectively. Roof panel 23A additionally has a weather strip 46 at its inner edge, with which roof panel 23B can be brought in contact. At their rear edges, roof panels 23A and 23B interact with a weather strip 47 that is formed at the front edge of the solid roof section 20. Moreover, the front cowl 35 has a weather strip 48 which interacts with the front edges of roof panels 22A and 22B.

We claim:

1. A vehicle roof, comprising
two lateral longitudinal roof beams that laterally define a roof opening and are connected to each other via a transverse roof beam that comprises a base support,
wherein the transverse roof beam is selectively secured to and detached from the longitudinal roof beams by a latching device and comprises
a fixing device for at least one rigid roof panel, the fixing device being displaceable between a locked position, in which the at least one rigid roof panel is secured, and a release position, in which the at least one rigid roof panel can be removed from the vehicle roof,
wherein the latching device comprises one latching element for each longitudinal roof beam, each latching element interacting with a respective latching counterpart; and
wherein the latching elements are latching hooks each pivotably mounted on the base support, the latching counterparts each being disposed on one of the longitudinal roof beams.

2. The vehicle roof according to claim 1, wherein the fixing device comprises a driving device for displacing kinematics.

3. The vehicle roof according to claim 2, wherein the driving device is a manually operable operating handle.

4. The vehicle roof according to claim 2, wherein the displacing kinematics comprises at least one displacing link for driving at least one fixing element.

5. The vehicle roof according to claim 4, wherein the fixing element is a fixing hook that is engaged with a fixing counterpart of the roof panel when the fixing device is in the locked position.

6. The vehicle roof according to claim 4, wherein the fixing element is a fixing pin that is engaged with a fixing counterpart formed on the roof panel when the fixing device is in the locked position.

7. The vehicle roof according to claim 2, wherein the displacing kinematics comprises at least one slide that can be displaced in relation to the base support.

8. The vehicle roof according to claim 7, wherein the slide drives a pivotable fixing hook for securing the roof panel.

9. The vehicle roof according to claim 7, wherein a fixing element, which is a pin, a roller or a hook, is disposed on the slide, said fixing element being engaged with a fixing counterpart formed on the roof panel when the fixing device is in the locked position.

10. The vehicle roof according to claim 1, wherein an operating device for the latching device is provided.

11. A vehicle roof, comprising two lateral longitudinal roof beams that laterally define a roof opening and are connected to each other via a transverse roof beam that comprises a base support, wherein the transverse roof beam is selectively secured to and detached from the longitudinal roof beams by a latching device and comprises a fixing device for at least one rigid roof panel, the fixing device being displaceable between a locked position, in which the at least one rigid roof panel is secured, and a release position, in which the at least one rigid roof panel can be removed from the vehicle roof;
  wherein an operating device for the latching device is provided; and
  wherein the operating device comprises a manually operable lever that is disposed on the underside of the base support.

12. The vehicle roof according to claim 10, wherein the operating device is connected to the latching elements via a coupling device.

13. The vehicle roof according to claim 1, wherein the latching elements can be pivoted between a locked position and a release position and are pre-loaded either in the direction of the locked position or in the direction of the release position by a spring device.

14. The vehicle roof according to claim 1, wherein at least one front roof panel and at least one rear roof panel are securable to the transverse roof beam by the fixing device.

* * * * *